United States Patent
Eddy et al.

(10) Patent No.: US 9,901,498 B2
(45) Date of Patent: *Feb. 27, 2018

(54) COMPACT WHEELCHAIR ASSEMBLY WITH REMOVABLE WHEELS AND METHODS THEREFOR

(71) Applicant: Medline Industries, Inc., Northfield, IL (US)

(72) Inventors: Zach Eddy, Chicago, IL (US); Nicodemus Winata, Hoffman Estates, IL (US); Maggie Andersen, Chicago, IL (US)

(73) Assignee: Medline Industries, Inc., Northfield, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/407,030

(22) Filed: Jan. 16, 2017

(65) Prior Publication Data

US 2017/0119603 A1    May 4, 2017

Related U.S. Application Data

(63) Continuation of application No. 14/518,641, filed on Oct. 20, 2014.

(51) Int. Cl.
*A61G 5/08* (2006.01)
*A61G 5/12* (2006.01)
(Continued)

(52) U.S. Cl.
CPC .......... *A61G 5/0875* (2016.11); *A61G 5/0825* (2016.11); *A61G 5/0883* (2016.11);
(Continued)

(58) Field of Classification Search
CPC .......... A61G 5/08; A61G 5/02; A61G 5/0875; A61G 5/0883; A61G 5/1083
See application file for complete search history.

(56) References Cited

U.S. PATENT DOCUMENTS

| | | | | |
|---|---|---|---|---|
| 3,838,869 A | * | 10/1974 | Falkenberg | A61G 5/08 280/42 |
| 4,392,690 A | * | 7/1983 | Anderson | A61G 5/10 280/250.1 |

(Continued)

OTHER PUBLICATIONS

Stabley, Michael "NonFinal OA", U.S. Appl. No. 14/518,641, filed Oct. 20, 2014; dated Dec. 17, 2015.
(Continued)

*Primary Examiner* — Kevin Hurley
*Assistant Examiner* — Michael R Stabley
(74) *Attorney, Agent, or Firm* — Philip H. Burrus, IV

(57) ABSTRACT

A wheelchair (100) includes a chassis (101) defining a seat (102), a backrest (103), one or more armrests (104,105), and an undercarriage (106). One or more front caster wheels (118,119) are coupled to, and selectively detachable from, the undercarriage. One or more rear wheel assemblies (120, 121) each include a rear wheel (125), an axle (127), and a mounting post (129) extending distally from the axle at a substantially orthogonal angle relative to the axle. One or more quick release devices (130,131) couple each mounting post of each rear wheel assembly to the undercarriage such that the each the one or more rear wheel assemblies is selectively detachable from the undercarriage.

19 Claims, 42 Drawing Sheets

(51) Int. Cl.
*A61G 5/10* (2006.01)
*B62B 5/04* (2006.01)
*B62B 5/06* (2006.01)
*B62B 3/02* (2006.01)

(52) U.S. Cl.
CPC ........... *A61G 5/101* (2013.01); *A61G 5/1018* (2013.01); *A61G 5/1083* (2016.11); *A61G 5/122* (2016.11); *A61G 5/125* (2016.11); *A61G 5/128* (2016.11); *B62B 3/02* (2013.01); *B62B 5/0438* (2013.01); *B62B 5/067* (2013.01); *B62B 2205/10* (2013.01)

(56) References Cited

U.S. PATENT DOCUMENTS

| | | |
|---|---|---|
| 4,474,385 A | 10/1984 | Costello |
| 4,648,619 A * | 3/1987 | Jungnell ................ A61G 5/08 280/250.1 |
| 4,993,732 A * | 2/1991 | Wedemeyer ........... A61G 5/025 280/250.1 |
| 5,188,383 A * | 2/1993 | Thompson ............... A61G 5/08 280/250.1 |
| 5,558,358 A | 9/1996 | Johnson |
| 5,560,627 A | 10/1996 | Zatulovsky et al. |
| 5,590,893 A * | 1/1997 | Robinson ................ A61G 5/00 280/250.1 |
| D427,949 S | 7/2000 | Schlangen |
| 6,092,822 A * | 7/2000 | Salmon ................ A61G 5/023 280/250.1 |
| 6,345,835 B1 * | 2/2002 | Watkins ................ A61G 5/08 280/47.371 |
| 6,464,243 B2 * | 10/2002 | Roche ................ A61G 5/08 280/250.1 |
| 6,886,843 B1 * | 5/2005 | Papac ................ A61G 5/00 280/250.1 |
| 7,077,422 B2 * | 7/2006 | Haury ................ A61G 5/08 280/644 |
| 7,451,992 B2 * | 11/2008 | Willis ................ A61H 3/04 280/47.4 |
| 7,537,237 B2 * | 5/2009 | Chung ................ A61G 5/00 280/47.38 |
| 7,669,881 B2 * | 3/2010 | Haury ................ A61G 5/08 280/649 |
| D618,141 S | 6/2010 | Chan |
| D622,641 S | 8/2010 | Chen et al. |
| D623,992 S | 9/2010 | Derks et al. |
| D624,459 S | 9/2010 | Jacobs et al. |
| D633,830 S | 3/2011 | Derks et al. |
| D635,895 S | 4/2011 | Jacobs et al. |
| 8,186,701 B2 | 5/2012 | Sim et al. |
| 8,434,775 B2 | 5/2013 | Patmont et al. |
| D699,160 S | 2/2014 | Yang |
| 2007/0018426 A1 * | 1/2007 | Willis ................ A61G 5/0825 280/304.1 |
| 2013/0075991 A1 * | 3/2013 | Satou ................ A61G 5/10 280/43 |
| 2014/0035260 A1 * | 2/2014 | Helterbrand ............ A61G 5/06 280/650 |
| 2015/0250667 A1 * | 9/2015 | Thompson ............... A61G 5/08 280/650 |

OTHER PUBLICATIONS

Stabley, Michael R., "Final OA", U.S. Appl. No. 14/518,641, filed Oct. 20, 2014; dated Apr. 1, 2016.
Hanson, Charles "Restriction Requirement", U.S. Appl. No. 29/506,779, filed Oct. 20, 2014; dated Jun. 2, 2016.
Stabley, Michael "Notice of Allowance", U.S. Appl. No. 14/518,641, filed Oct. 20, 2014; dated Jul. 14, 2016.
Hanson, Charles "Notice of Allowance", U.S. Appl. No. 29/506,779, filed Oct. 20, 2014; dated Aug. 26, 2016.
"Medline Catalog", *Bariatric Steel Transport Chairs by Drive/DeVilbiss Healthcare*; Medline Catalog; http://www.medline.com/catalog/catalog.jsp; Unknown Publication date but believed to be prior to present application filing date.
"Medline Catalog", *Hybrid 2 Transport Wheelchair Chairs*; Medline Catalog; http://www.medline.com/catalog/catalog.jsp; Unknown Publication date but believed to be prior to present application filing date.
"Medline Catalog", *Transport Chair by AliMed*; Medline Catalog; http://www.medline.com/catalog/catalog.jsp; Unknown Publication date but believed to be prior to present application filing date.
Stabley, Michael "Notice of Allowance", U.S. Appl. No. 14/518,641, filed Oct. 20, 2014; dated Oct. 28, 2016.

* cited by examiner

COMPACT WHEELCHAIR ASSEMBLY WITH REMOVABLE WHEELS AND METHODS THEREFOR

CROSS REFERENCE TO PRIOR APPLICATIONS

This application is a continuation under 35 USC § 120 of, and thus claims priority to, U.S. application Ser. No. 14/518,641, filed Oct. 20, 2014, which is incorporated by reference for all purposes.

BACKGROUND

Technical Field

This disclosure relates generally to personal transport devices, and more particularly to wheelchairs.

Background Art

For many people, wheelchairs are their only mode of transportation. Many elderly, injured, or disabled people use wheelchairs as their primary (or only) mode of transportation. While providing much needed transportation to their patients, many wheelchairs are quite large and bulky. While some wheelchairs are collapsible so they can be stowed when not in use, their large bulk frequently results in difficulty in loading a chair into a vehicle or otherwise stowing the chair.

It would be advantageous to have an improved wheelchair that was more compact in design.

Figure 1:
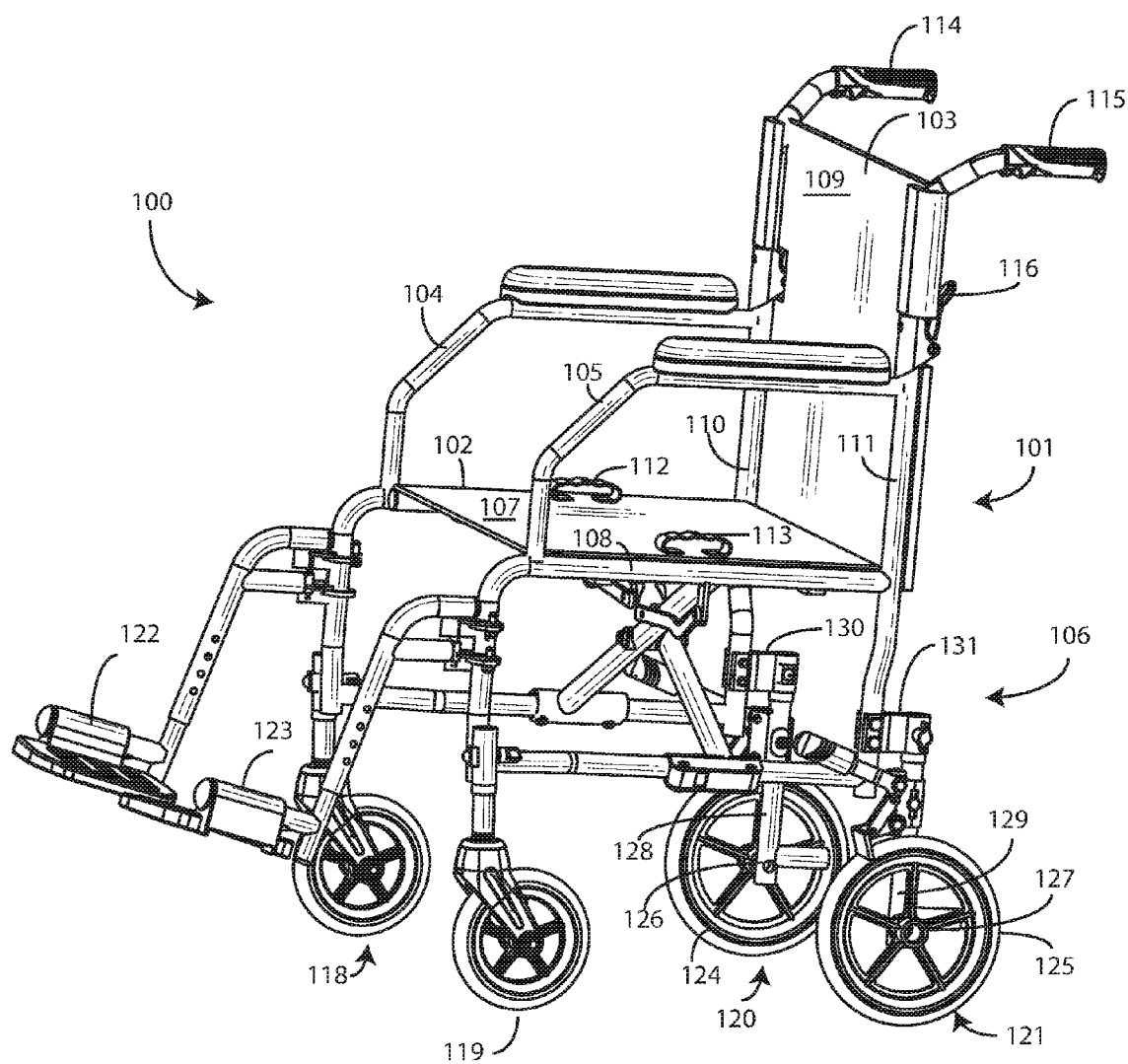
FIG. 1 illustrates a perspective view of one explanatory wheelchair in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A. The term "substantially" and the term "about," as used herein, are intended to refer to a desired orientation inclusive of manufacturing tolerances. Accordingly, a "substantially" orthogonal angle with manufacturing tolerances of plus or minus two degrees would include angles of between, and including eighty-eight to ninety two degrees. It is expected that one of ordinary skill, notwithstanding possibly significant effort and many design choices motivated by, for example, available time, current technology, and economic considerations, when guided by the concepts and principles disclosed herein will be readily capable of generating the embodiments described below with minimal experimentation.

As noted above, while some wheelchairs are collapsible, they can be quite bulky even when in their collapsed states. Embodiments of the present disclosure contemplate that one of the reasons for this bulk in the collapsed state is due to the fact that the wheels and hubs extend outwardly from the frame, thus adding length and width to the collapsed chair. When the wheels remain on the chair in the collapsed state, the overall length and width of the object remains quite large. This large size presents problems.

The inventors have discovered that one such problem is that of shelf space in retail outlets. Embodiments of the disclosure contemplate that many retailers, including drug stores, big box stores, and other retailers generally do not put wheelchairs on their shelves—even in the collapsed state—because the accompanying packaging is just too large. For example, most packaged wheelchairs, even when packaged in their collapsed state, at a minimum measure about thirty-two inches by twenty-three inches by nine inches.

Embodiments of the present disclosure make it economically possible for retailers to place wheelchairs on their shelves by providing a wheelchair assembly that, when in its collapsed and packaged state, is dramatically smaller than are prior art chairs. In one embodiment, this reduction in dimension is provided by way of rear wheels that extend outwardly from the rear of the chair to offer increased stability, but that are removable from the chair when the chair is to be collapsed for stowage. Illustrating by example, in one embodiment, a chair in accordance with one or more embodiments of the disclosure, when in the collapsed state, can easily fit within a package measuring twenty-three inches by twenty-one inches by nine inches. This results in a thirty-four percent reduction in size over prior art designs when in the collapsed configuration. Embodiments of the disclosure contemplate that many retailers are more than willing to put packages having these reduced dimensions on their shelves. Accordingly, embodiments of the disclosure provide a benefit to both consumer and retailer. The consumer is benefitted by having an increased number of retail outlets in which to purchase a wheelchair. The consumer is additionally benefitted by having a wheelchair that is far smaller than prior art designs when in the collapsed position. The retailer benefits because they have a new product that can be displayed on shelves without consuming too much space.

In one embodiment, a wheelchair includes a chassis defining a seat, a backrest, one or more armrests, and an undercarriage. The wheelchair can also include one or more front caster wheels that are coupled to, and selectively detachable from, the undercarriage of the chassis.

The wheelchair can also include one or more rear wheel assemblies. Each rear wheel assembly can comprise a rear wheel, an axle, and a mounting post extending distally from the axle at a substantially orthogonal angle relative to the axle. In one embodiment, one or more quick release devices are used to selectively couple each mounting post to the undercarriage so that each rear wheel assembly is selectively detachable from the undercarriage. When the rear wheel assemblies are detached from the undercarriage, the chassis can be folded into a collapsed position. In one embodiment, once folded, the chassis can be placed into a package measuring less than twenty-three inches by twenty-one inches by nine inches such that a drugstore or retailer can present the package on a retail shelf in accordance with their maximum sizing requirements.

Figure 2:
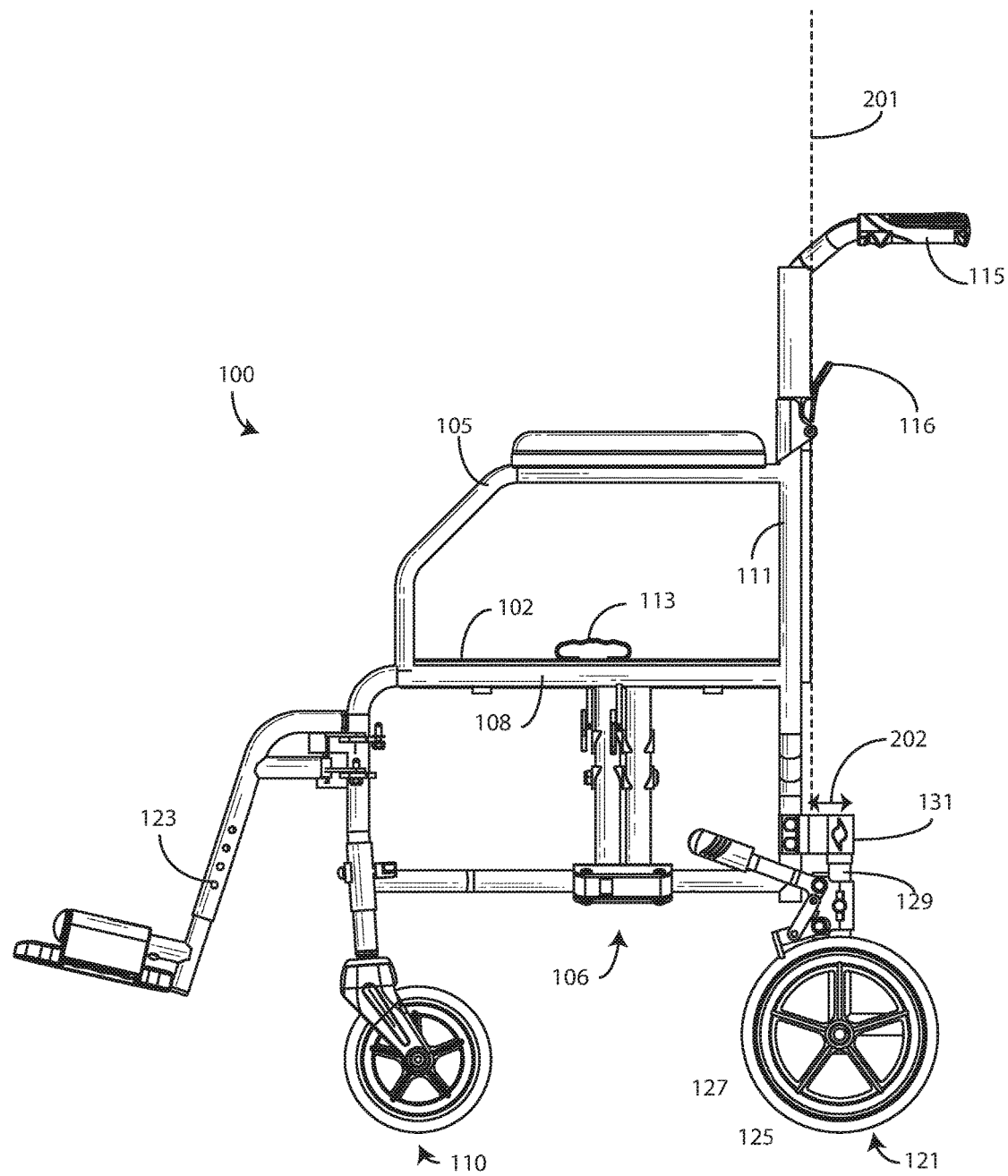
FIG. 2 illustrates a side elevation view of one explanatory wheelchair in accordance with one or more embodiments of the disclosure.
Figure 3:
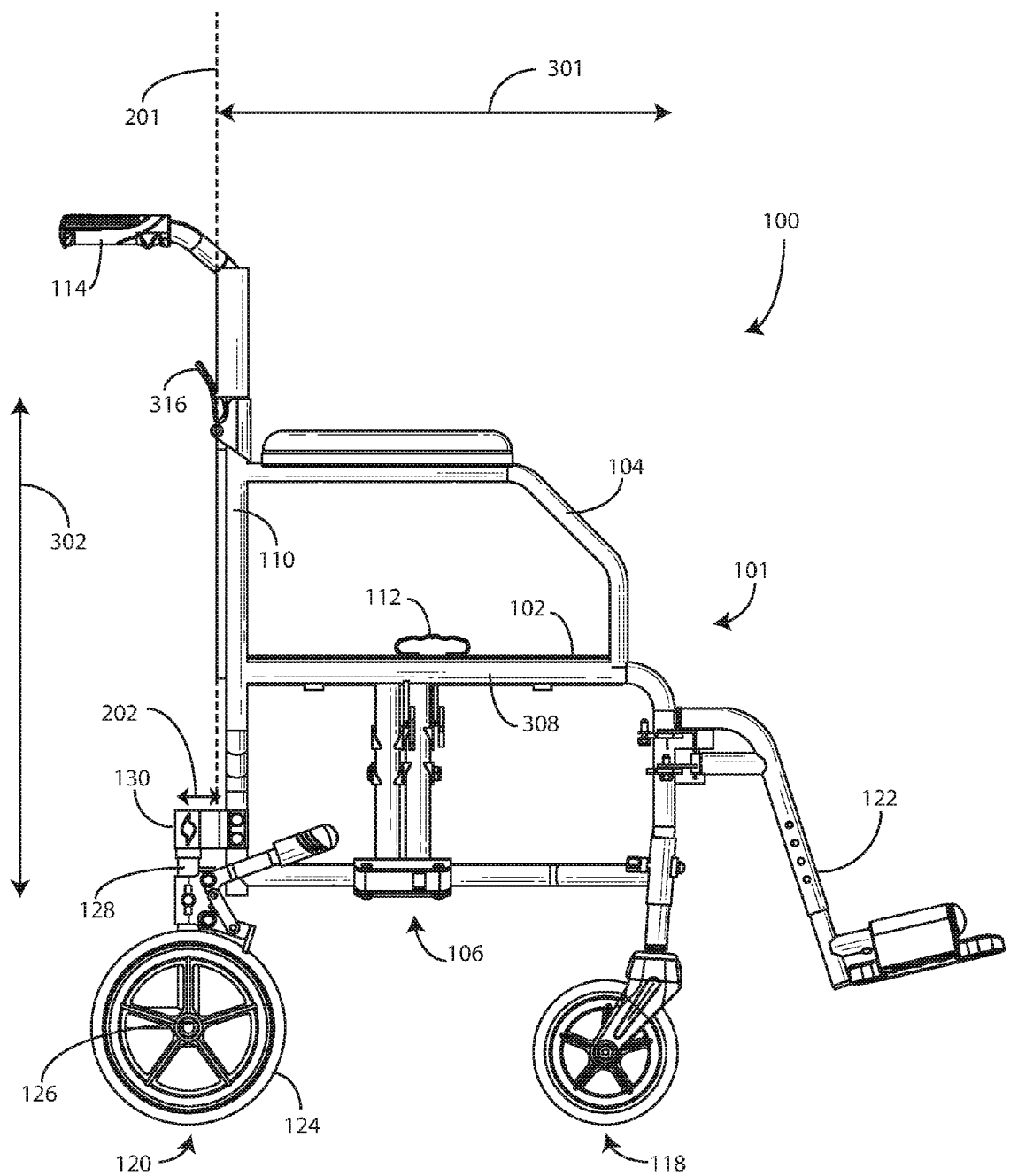
FIG. 3 illustrates another side elevation view of one explanatory wheelchair in accordance with one or more embodiments of the disclosure.
Figure 4:
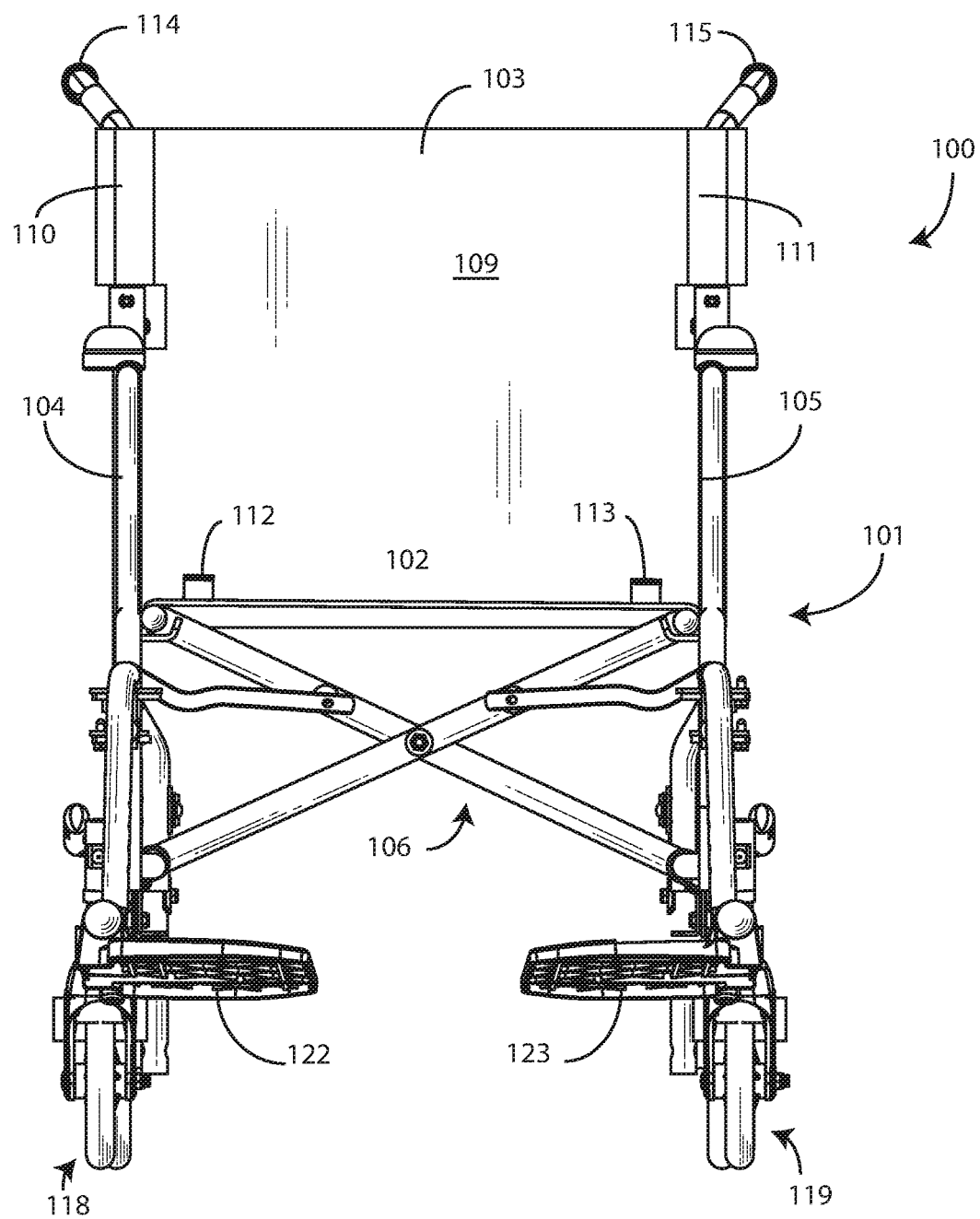
FIG. 4 illustrates a front elevation view of one explanatory wheelchair in accordance with one or more embodiments of the disclosure.
Figure 5:
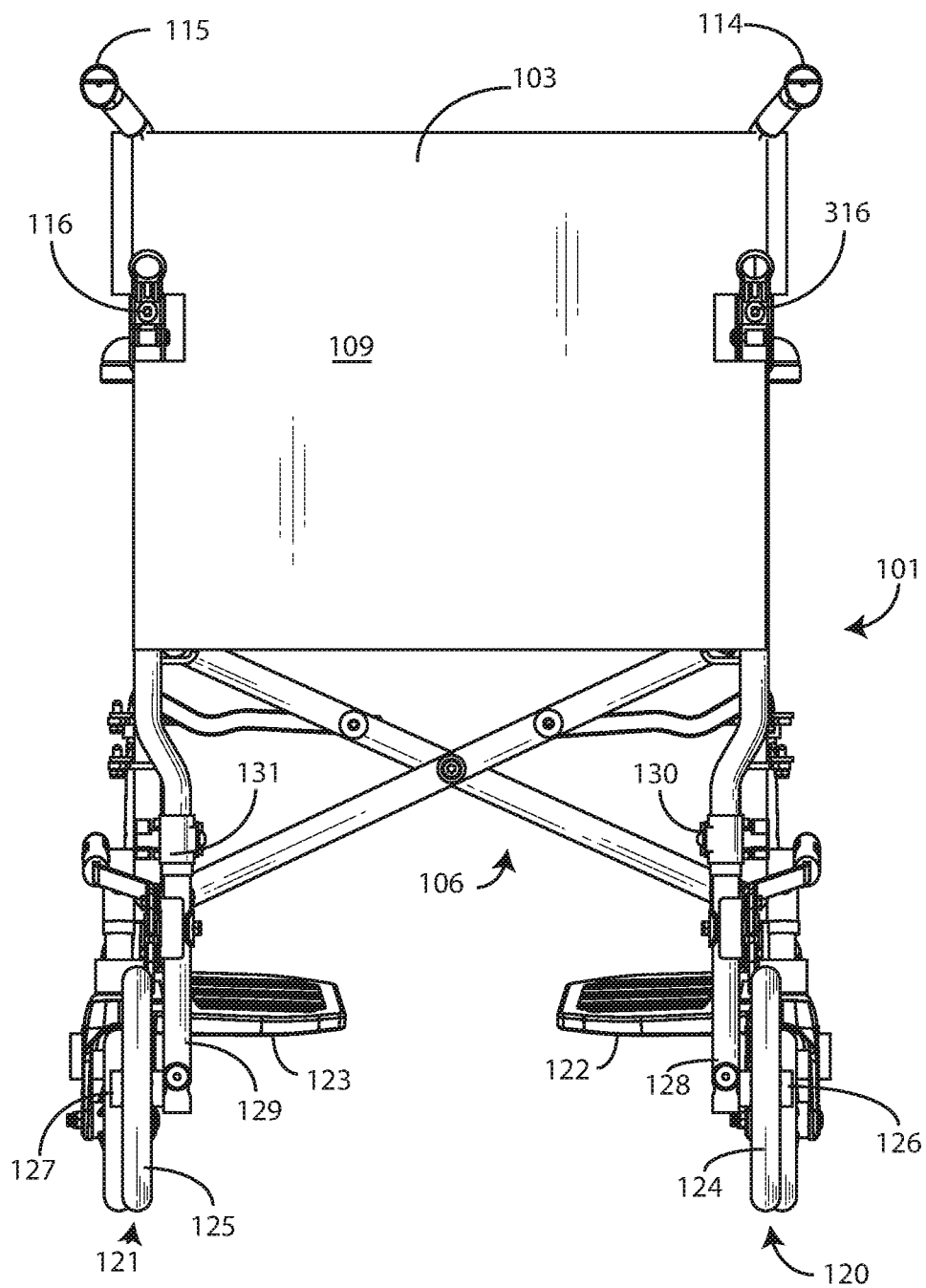
FIG. 5 illustrates a rear elevation view of one explanatory wheelchair in accordance with one or more embodiments of the disclosure.
Figure 6:
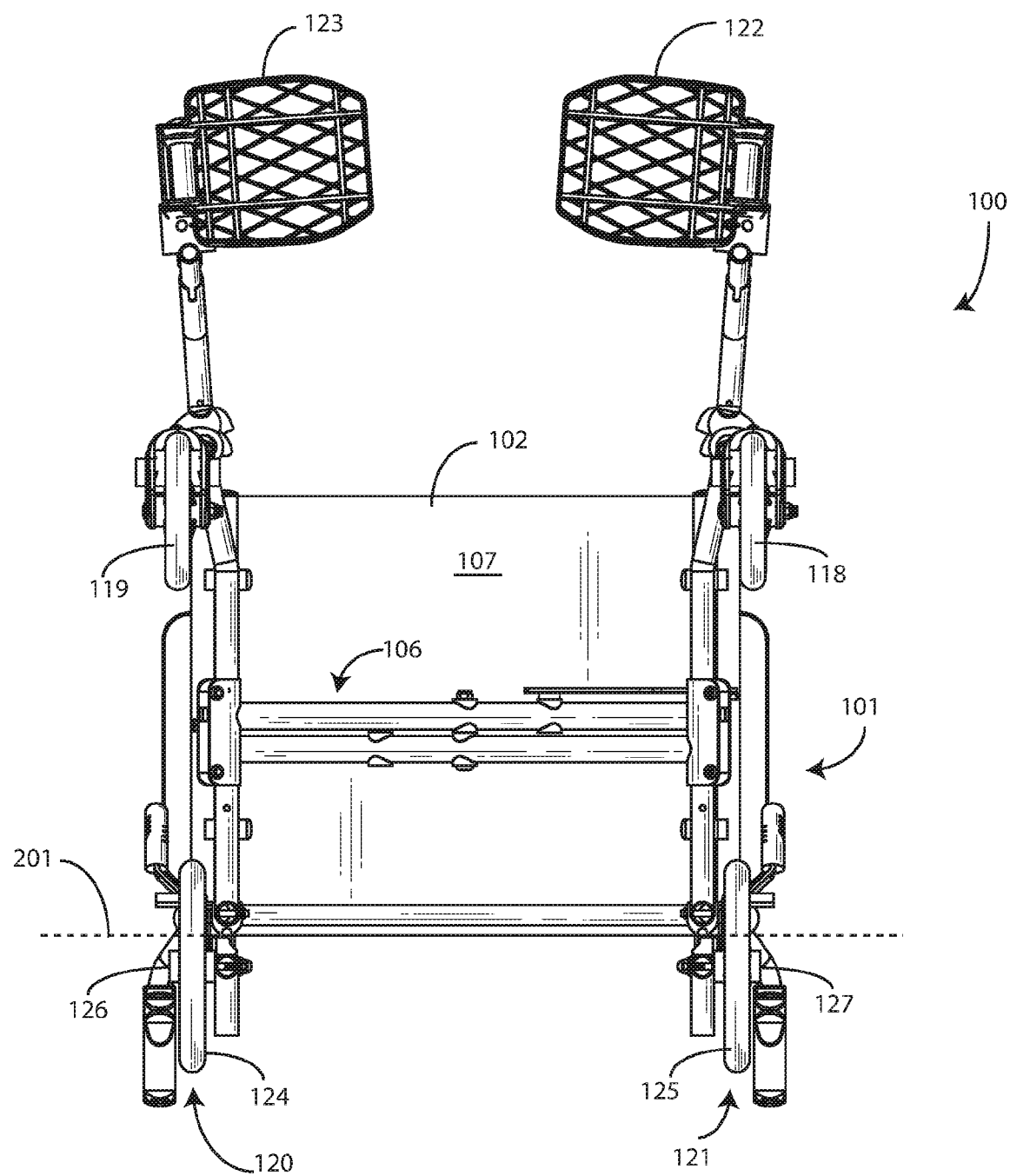
FIG. 6 illustrates a bottom plan view of one explanatory wheelchair in accordance with one or more embodiments of the disclosure.
Figure 7:
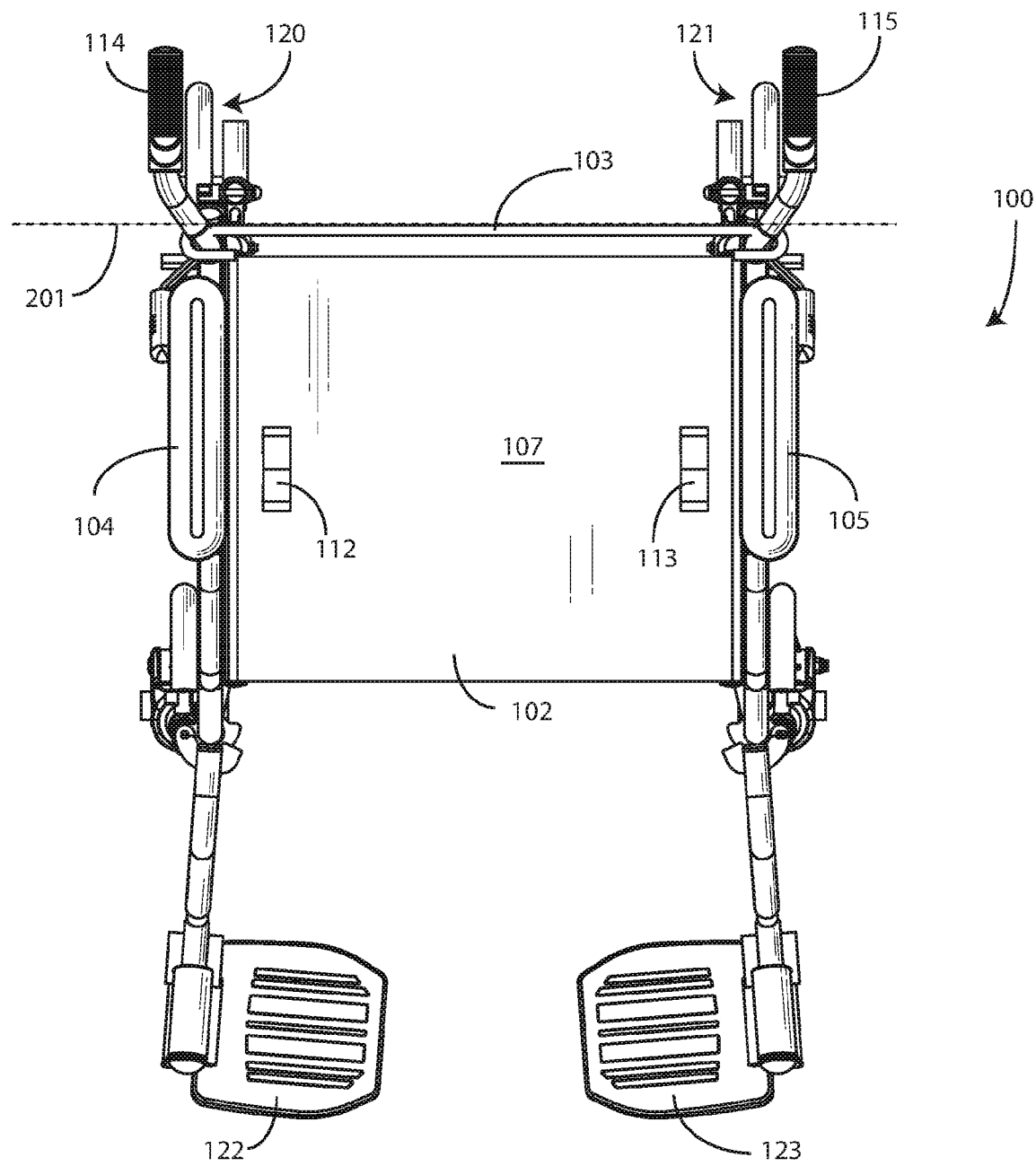
FIG. 7 illustrates a top plan view of one explanatory wheelchair in accordance with one or more embodiments of the disclosure.
Figure 8:
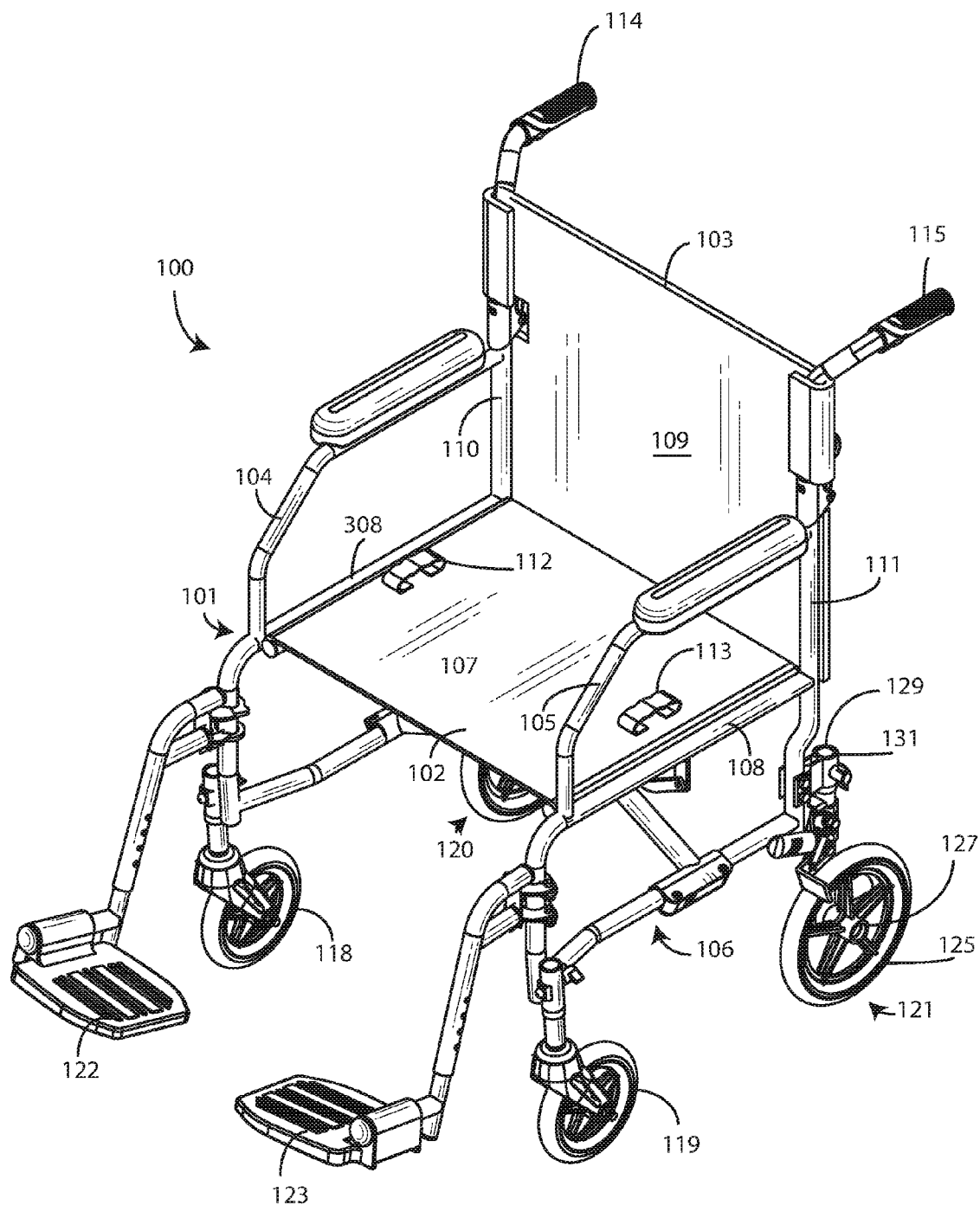
FIG. 8 illustrates another perspective view of one explanatory wheelchair in accordance with one or more embodiments of the disclosure.
Figure 9:
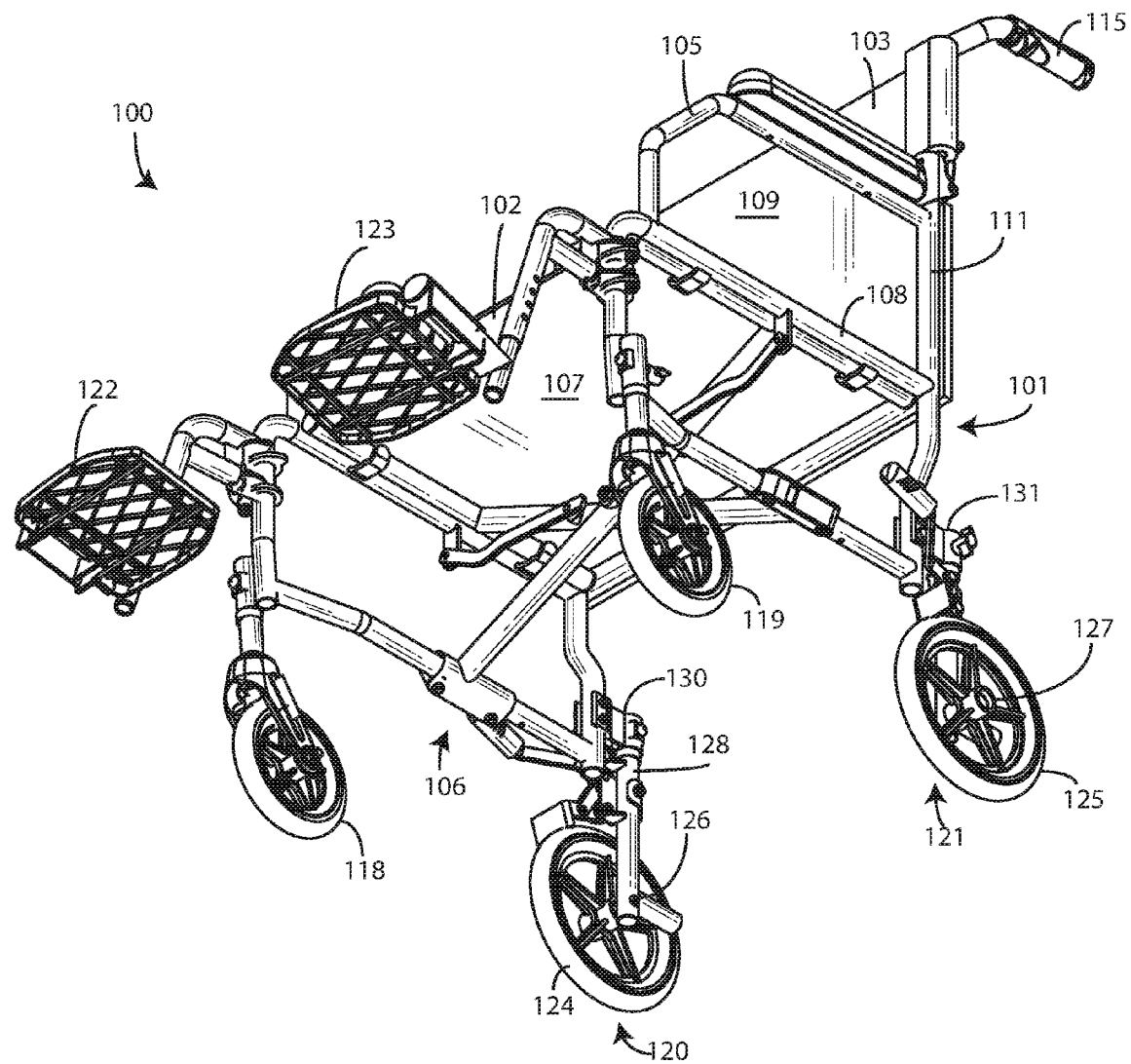
FIG. 9 illustrates yet another perspective view of one explanatory wheelchair in accordance with one or more embodiments of the disclosure.
Figure 10:
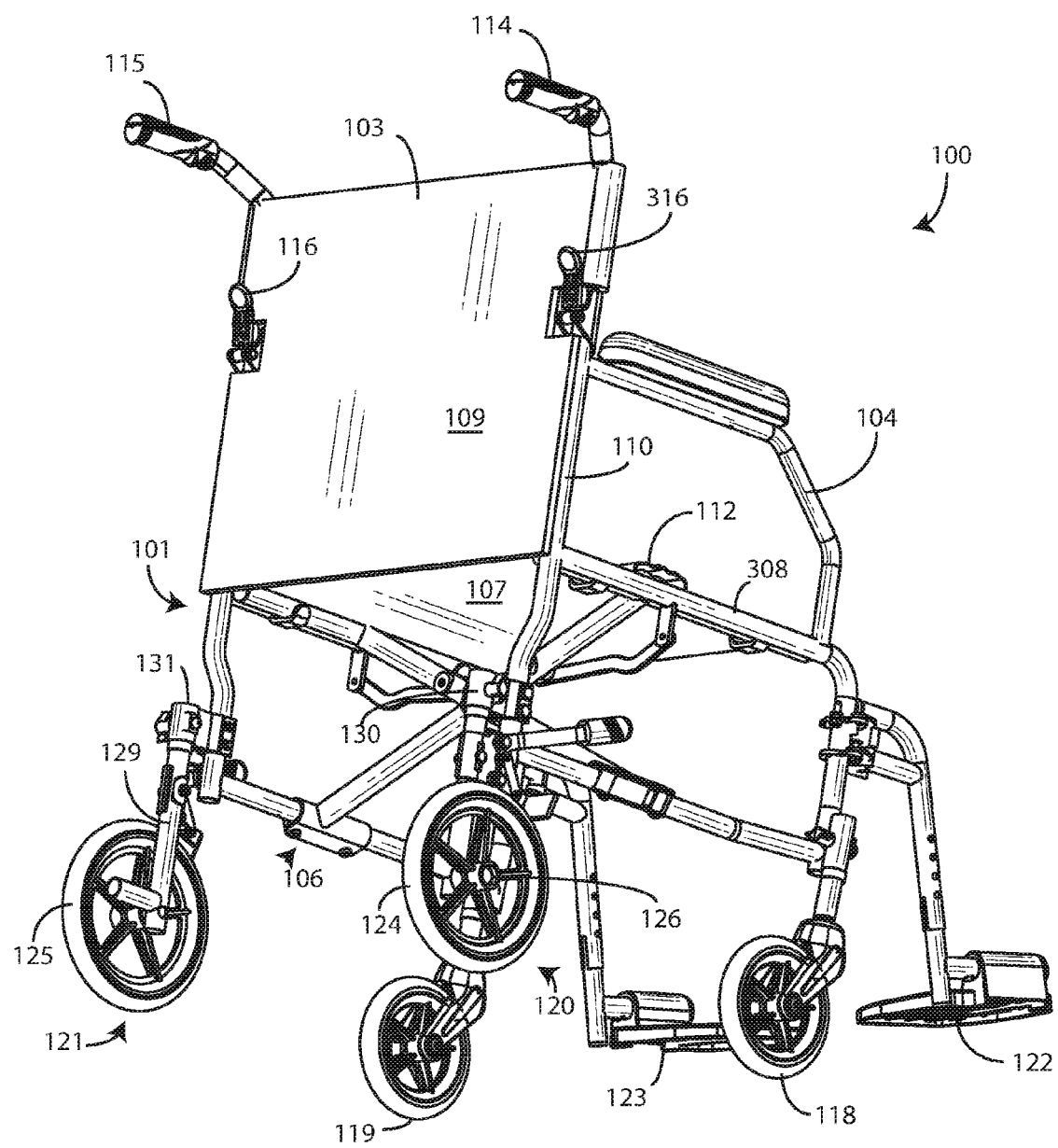
FIG. 10 illustrates yet another perspective view of one explanatory wheelchair in accordance with one or more embodiments of the disclosure.

Turning now to FIGS. 1-10, illustrated therein are various views of a wheelchair 100 configured in accordance with one or more embodiments of the disclosure. FIG. 1 illustrates a perspective view of the wheelchair 100, while FIGS. 2-3 illustrate side elevation views of the wheelchair 100. FIGS. 4-5 illustrate front and rear elevation views of the wheelchair 100, while FIGS. 6 and 7 illustrate top and bottom plan views of the wheelchair 100. FIGS. 8-10 each illustrate alternate perspective views of the wheelchair 100. While some features of the wheelchair 100 described below are functional and utilitarian, it is noted that the wheelchair 100 also includes novel and non-obviousness ornamental appearance features as well. These ornamental features, being shown in FIGS. 1-10 by illustration, will not be further described in this specification.

As shown in FIGS. 1-10, the wheelchair 100 includes a chassis 101. In one embodiment, the chassis 101 is constructed from a tubular metal, such as steel or aluminum. In the illustrative embodiment of FIGS. 1-10, the chassis defines a seat 102, a backrest 103, one or more armrests 104,105, and an undercarriage 106.

In one embodiment, the seat 102 and the backrest 103 can comprise a layer of organic, inorganic, or organic/inorganic blended fabric spanning two side portions of the chassis. Illustrating by example, in this embodiment the seat 102 is defined by a layer of material 107 that spans two horizontal side members 108,308. The layer of material 107 and the two horizontal side members 108,308. In this illustrative embodiment, the layer of material 107 and the two horizontal side members 108,308 define a first plane.

Similarly, in this embodiment the backrest 103 is defined by another layer of material 109 that spans two vertical side members 110,111. The layer of material 109 and the two vertical side members 110,111 define a second plane. The second plane defines the "rear side" 201 of the chassis 101.

In one embodiment, to assist the user in getting into, and out of, the wheelchair 100, the layer of material 107 defining the seat 102 includes two handles 112,113. In this embodiment, the handles 112,113 are configured as loops that are coupled to the layer of material 107. A user can grasp these handles 112,113 to assist in sliding along the seat 102 of the wheelchair 100.

In one embodiment, the vertical side members 110,111 defining the rear side 201 of the wheelchair 100 have extending therefrom two push handles 114,115 with which a user can push the wheelchair when a patient is seated on the seat 102. In this embodiment, to make things more compact when the wheelchair is collapsed, the two push handles 114,115 are collapsible, i.e., can fold downward to be adjacent to the vertical side members 110,111. In one embodiment, an upper portion of the vertical side member 110,111 folds downward to be adjacent to, and substantially parallel with, a lower portion of the vertical side member 110,111. This results in the two push handles 114,115 again being substantially orthogonal with the vertical side members 110,111, but pointing in a direction opposite that in which they are pointing in FIGS. 1-10. The collapsed position is shown illustratively in FIGS. 17-26.

Two locking switch levers 116,316 facilitate this selective collapsibility of the push handles 114,115. When the locking switch levers 116,316 are pivoted upward, they serve to lock the push handles 114,115 in the upright position where they are substantially perpendicular to the two vertical side members 110,111. When pivoted downward, the locking switch levers 116,316 allow the two push handles 114,115 to fold downward. In one embodiment, the vertical side members 110,111 fold approximately at the location of the locking switch levers 116,316 so as to cause a portion of each vertical side member 110,111 located above the corresponding locking switch lever 116,316 to be adjacent to, and substantially parallel with, a lower portion of the vertical side members 110,111 disposed below the locking switch levers 116,316. This results in the two push handles 114,115 again being substantially orthogonal with the vertical side members 110,111, but pointing in a direction opposite that in which they are pointing in FIGS. 1-10. The collapsed position is shown illustratively in FIGS. 17-26.

In one embodiment, the wheelchair 100 includes one or more wheels. In this illustrative embodiment, one or more front caster wheels 118,119 are coupled to, and selectively detachable from, the undercarriage 106. Similarly, one or more rear wheel assemblies 120,121 are coupled to, and are selectively detachable from, the undercarriage 106.

In one embodiment, to provide additional compactness of the chassis 101 when in the folded configuration, yet to provide increased lateral stability between the front and rear of the wheelchair 100, the rear wheel assemblies 120,121 are strategically coupled to the undercarriage 106. As best shown in FIGS. 2-3, in this illustrative embodiment the rear wheel assemblies 120,121 are coupled to the undercarriage 106 such that they extend distally away from the rear side 201 of the wheelchair. In this embodiment, the rear wheel assemblies 120,121 are coupled to the undercarriage 106 such that they extend distally away from the rear side 201 of the wheelchair 100 at substantially an orthogonal angle. Said differently, in one embodiment the rear wheel assemblies 120,121 extend distally, at substantially an orthogonal angle, from the layer of material 109 and the two vertical side members 110,111 defining the second plane that defines the rear side 201 of the wheelchair.

When viewed in the plan view of FIGS. 6-7, it can be seen that in one embodiment the chassis 101, without the two push handles 114,115 and the detachable footrests 122,123, is substantially rectangular in shape. Accordingly, the fact that the rear wheel assemblies 120,121 extend distally, at substantially an orthogonal angle, from the layer of material 109 and the two vertical side members 110,111 defining the second plane that defines the rear side 201 of the wheelchair means that the two rear wheel assemblies 120,121 extend outward from a perimeter defined by this rectangular shape. This configuration provides additional stability for the user when leaning against the backrest 103 while the wheelchair 100 is in use. At the same time, the detachability of the rear wheel assemblies 120,121 from the undercarriage 106 means that the depth of the rectangular shape, as viewed in FIGS. 6-7, is decreased when the rear wheel assemblies 120,121 are removed. Thus, the detachability results in a more compact form factor for the chassis 101 when folded into a collapsed configuration.

In one embodiment, each rear wheel assembly 120,121 comprises a rear wheel 124,125, an axle 126,127, and a mounting post 128,129. In this illustrative embodiment, the mounting posts 128,129 extend distally from the axle 126, 127 at a substantially orthogonal angle relative to the axle 126,127. In one embodiment, the rear wheel 124,125, axle, 126,127, and mounting post 128,129 are perdurably coupled together such that they are only to be separable with the use of tools. For example, while the rear wheels 124,125 can be coupled to the axle 126,127 by way of a lug nut, in one embodiment this is a perdurable connection in which a tool is required to remove the lug nut.

In one embodiment, one or more quick release devices 130,131 are used to couple the rear wheel assemblies 120,121 to the undercarriage 106. Accordingly, in one embodiment each mounting post 128,129 of each rear wheel assembly 120,121 is coupled to the undercarriage 106 by a quick release device 130,131 such that the each the one or more rear wheel assemblies 120,121 is selectively detachable from the undercarriage 106. This is shown illustratively in FIGS. 11-12.

Figure 11:
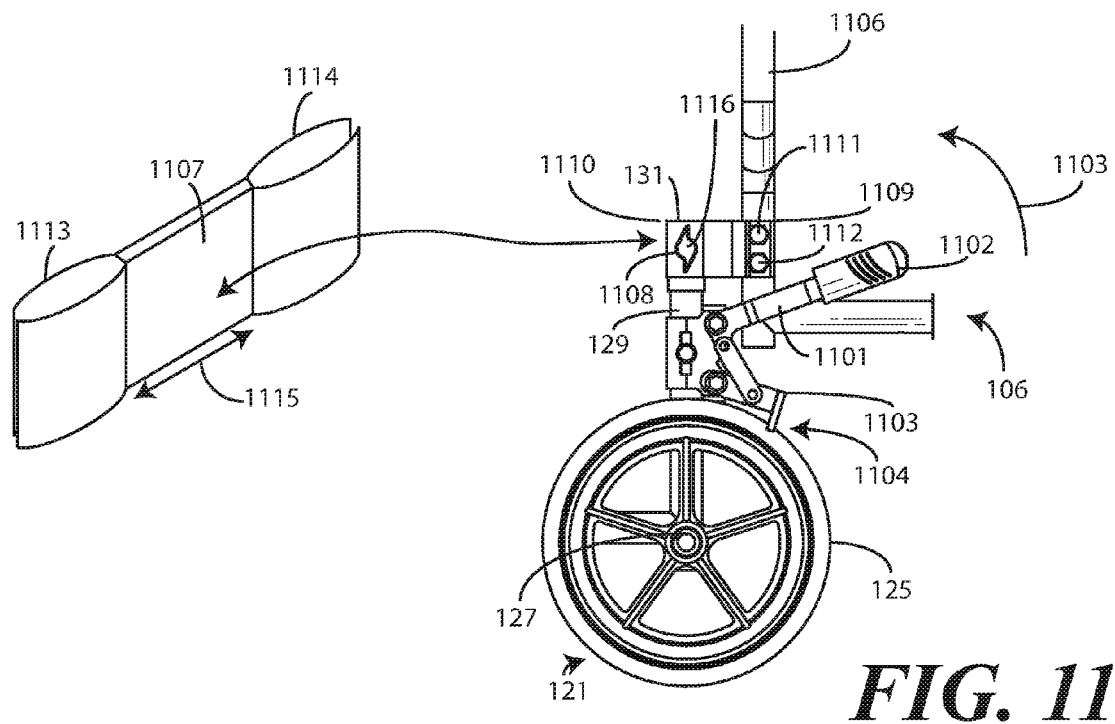
FIGS. 11 and 13 illustrate an explanatory rear-wheel assembly in accordance with one or more embodiments of the disclosure.

Turning briefly to FIG. 11, illustrated therein is one explanatory rear wheel assembly 121. As shown, the rear wheel assembly 121 includes a rear wheel 125, an axle 127, and a mounting post 129. This particular rear wheel assembly 121 also includes a brake assembly 1101. In this embodiment, the brake assembly 1101 is coupled to the mounting post 129 of the rear wheel assembly 121. The brake assembly 1101 comprises a handle 1102 to pivot 1103 to selectively apply stopping friction 1104 to the rear wheel 125 with a mechanical lever 1105. It is noted that the term "selectively" as used herein means user selectable. For example, the handle 1102 of the brake assembly 1101 can be pivoted 1103 from a first position, where no stopping friction 1104 is applied to the rear wheel 125, to a second position where the stopping friction 1104 is applied to the rear wheel 125. The user can select to apply the stopping friction 1104 by selectively pivoting the handle 1102 between the first position and the second position.

In this illustrative embodiment, the brake assembly 1101 is attached only to the mounting post of the rear wheel assembly 121, and not to the undercarriage 106. Accordingly, when the rear wheel assembly 121 is detached from the undercarriage 106, the brake assembly 1101 will be detached from the undercarriage as well. This detachment will be shown below with reference to FIG. 12.

As previously described, a quick release device 131 is used to couple the rear wheel assembly 121 to a tubular post 1106 of the undercarriage 106. In this illustrative embodiment, the quick release device 131 comprises an extended figure eight clamp 1107 and one or more threaded retention devices 1108,1111,1112 to couple a first end 1109 of the quick release device 131 to the undercarriage 106 and a second end 1110 of the quick release device 131 to the mounting post 129 of the rear wheel assembly 121. The quick release device 131 is referred to as an "extended figure eight" clamp 1107 because it includes two open-ended clamping loops 1113,1114 that are separated by an offset member 1115. The offset member 1115 extends one of the open ended clamping loops 1113 from the other open ended clamping loop 1114. Hence, the "figure eight" defined by the open ended clamping loops 1113,1114 is extended by the offset member 1115 to form the extended figure eight clamp 1107.

In one embodiment, the one or more threaded retention devices 1108,1111,1112 comprise at least a first threaded retention device 1111 to couple the first end 1109 of the extended figure eight clamp 1107 to the undercarriage 106. A second threaded retention device 1108 is used to couple the second end 1110 of the extended figure eight clamp 1107 to the mounting post 129. In this illustrative embodiment, a third threaded retention device 1112 is used to couple the first end 1109 of the extended figure eight clamp 1107 to the undercarriage 106 as well.

In this illustrative embodiment, the two threaded retention devices 1111,1112 coupling the first end 1109 of the extended figure eight clamp 1107 to the undercarriage 106 are perdurable coupling members, which means that they are not to be removed from the undercarriage 106 in normal operation without the use of tools. By contrast, in this embodiment the second threaded retention device 1108 comprises a handle 1116 (better seen in FIG. 12 below) to enable tool-less rotation of the second threaded retention device 1108 to couple, or release, the second end 1110 of the extended figure eight clamp 1107 to the mounting post 129 of the rear wheel assembly 121.

Figure 12:
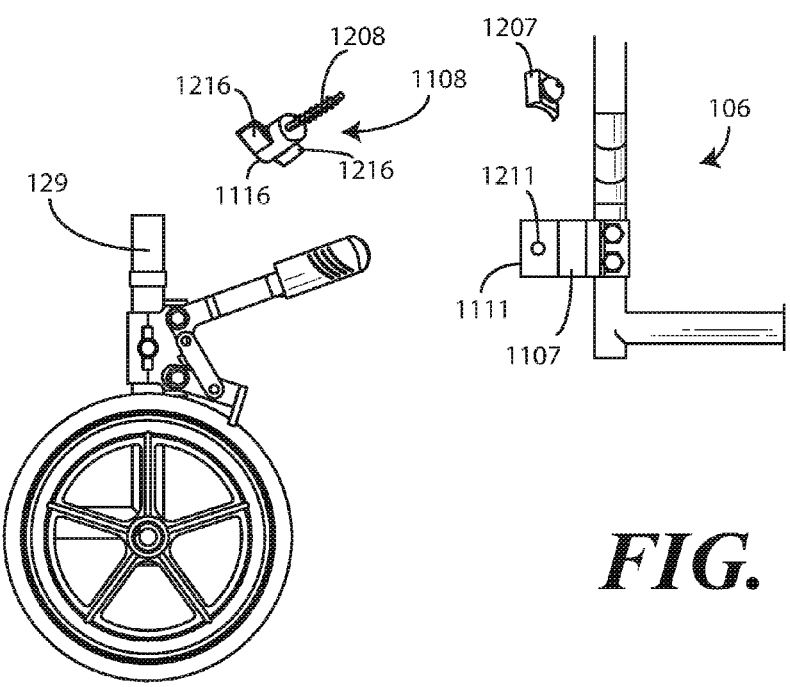
FIG. 12 illustrates an explanatory rear-wheel assembly disassembled in accordance with one or more embodiments of the disclosure.

Turning now to FIG. 12, illustrated therein is the rear wheel assembly 121 when removed from the undercarriage 106. As shown in FIG. 12, in one embodiment the second threaded retention device 1108 includes a handle 1116 that has two distally extending finger levers 1216 and a threaded member 1208. The distally extending finger levers 1216 allow a user to rotate the second threaded retention device 1108 without the use of tools to release it from a coupling device 1207. For this reason, the second threaded retention device 1108 is referred to as a tool-less retention device that allows quick, tool-less removal of the rear wheel assembly 121 from the chassis 101. The rear wheel assembly 121 can be reattached to the undercarriage 106 by inserting the mounting post 129 into the second end 1110 of the extended figure eight clamp 1107, inserting the second threaded retention device 1108 into an aperture 1211 of the second end 1110 of the extended figure eight clamp 1107, and finger-twisting the threaded member 1208 into the coupling device 1207.

Figure 13:
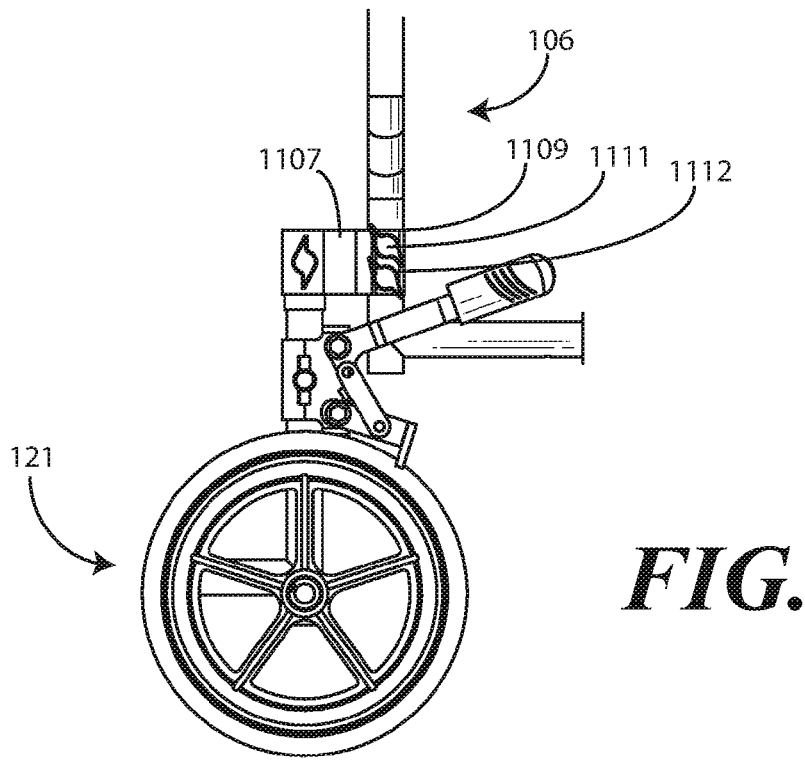
Figure 14:
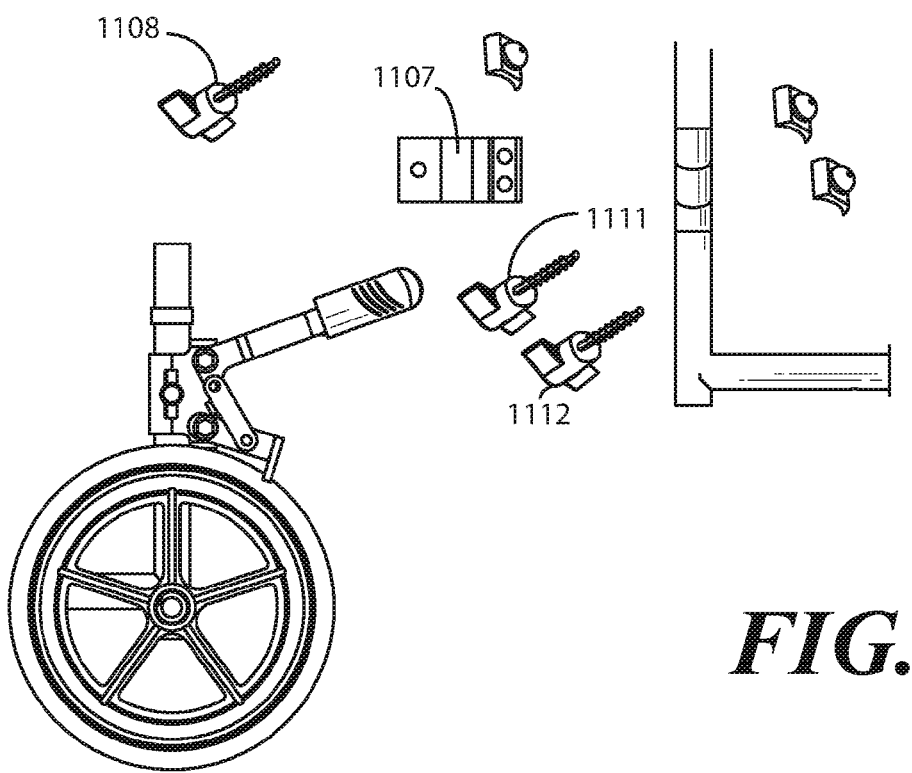
FIG. 14 illustrates an explanatory rear wheel assembly in another disassembled configuration in accordance with one or more embodiments of the disclosure.

FIGS. 13-14 illustrate a slightly different configuration. Turning now to FIG. 13, illustrated therein is another rear wheel assembly 121. The configuration is the same as that shown in FIGS. 11-12, with the exception of the two threaded retention devices 1111,1112 coupling the first end 1109 of the extended figure eight clamp 1107 to the undercarriage 106. Rather than being perdurable connecting members, as was the case in the embodiment of FIG. 13, they are instead tool-less threaded retention members. Accordingly, as shown in FIG. 14, all three of the threaded retention devices 1108,1111,1112 can be released without tools to completely remove the extended figure eight clamp 1107 from the chassis 106, in addition to separating the rear wheel assembly 121 from the chassis. The embodiments of FIGS. 11-14 are illustrative only, as still other embodiments will be shown with reference to FIGS. 29-30 below. Still others will be obvious to those of ordinary skill in the art having the benefit of this disclosure.

Turning now back to FIGS. 1-10, the orientation of the connection of the one or more rear wheel assemblies 120, 121 to the undercarriage 106, at least the orientation in one or more embodiments, will be explained in more detail. As can be seen in the figures, in one embodiment each of the one or more quick release devices 130,131 are to couple to the undercarriage 106 of the chassis 101 in an orientation that is substantially parallel with the one or more armrests 104,105. This orientation helps to ensure that the one or more rear wheel assemblies 120,121 extend distally from the rear side 201 of the chassis 101 at a maximum distance to promote front-to-rear wheelchair stability.

In one or more embodiments, as best seen in FIGS. 2-3, the one or more quick release devices 130,131 are to offset 202 the mounting posts 128,129 from the rear side 201 of the chassis 101 by at least one inch. Said differently, in one embodiment the one or more quick release devices 130,131 are to offset 202 the mounting posts 128,129 from the plane defined by the backrest 103 of the wheelchair 100 by at least one inch. Embodiments of the disclosure contemplate that this distance provides suitable stability for the wheelchair 100 when a person sits in the seat 102 and leans against the backrest 103. In one embodiment, the one or more quick release devices 130,131 are to offset 201 the mounting posts 128,129 from the plane defined by the backrest 103, i.e., the rear side 201 of the chassis 101, by about two inches.

In one embodiment, as best seen in FIG. 2-3, the undercarriage 106 defines a first dimension 301 that is oriented substantially parallel to a plane defined by the seat 102 of the wheelchair 100. The undercarriage 106 also defines a second dimension 302 that is oriented substantially orthogonal with the plane defined by the seat 102 of the wheelchair 100. In this illustrative embodiment, each of the quick release devices 130,131 offsets 202 the mounting post 128,129 of each rear wheel assembly 120,121 from the plane defined by the backrest 103, i.e., the rear side 201 of the chassis 101, by at least one inch. As will be shown in more detail with reference to FIGS. 17-24 below, in one embodiment when the two push handles 114,115 are collapsed as described previously, and the front caster wheels 118,119 and rear wheel assemblies 120,121 are detached from the chassis 101, and the chassis 101 is folded to form a folded chassis, both the first dimension 301 and the second dimension 302 are reduced to such an extent that it has a length less than twenty-four inches, a width less than twenty-two inches, and a height less than ten inches.

Figure 15:
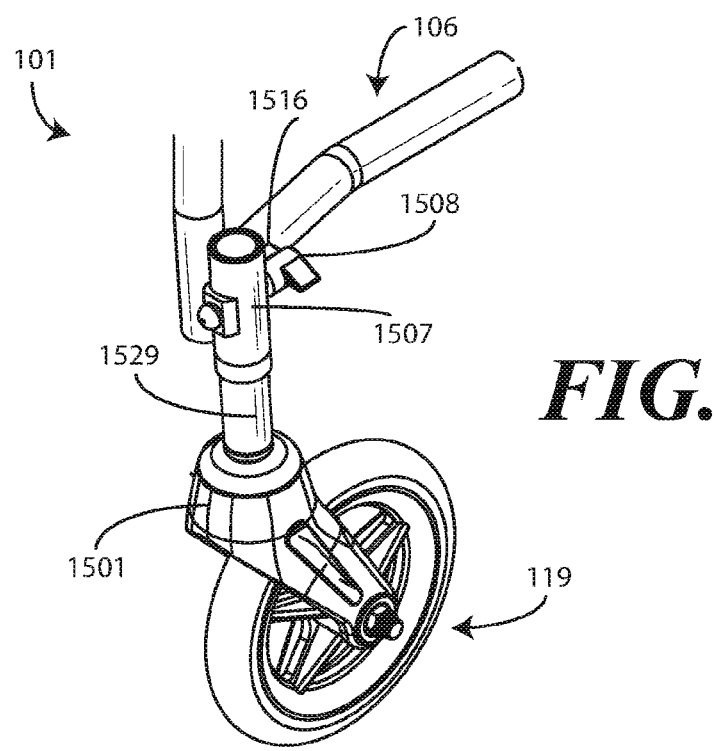
FIG. 15 illustrates an explanatory front wheel assembly in accordance with one or more embodiments of the disclosure.
Figure 16:
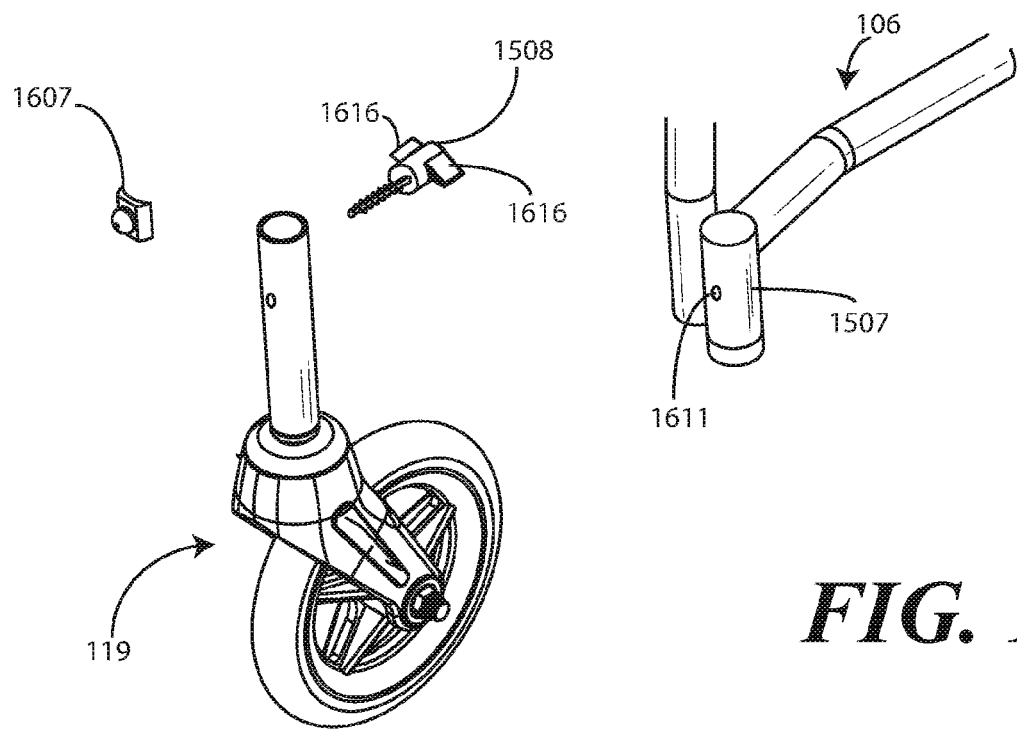
FIG. 16 illustrates an explanatory front wheel assembly disassembled in accordance with one or more embodiments of the disclosure.

As noted above, in one or more embodiments, the one or more front caster wheels 118,119 are additionally removable. Turning now to FIGS. 15-16, illustrated therein is one method for removing a front caster wheel 119 in accordance with one or more embodiments of the disclosure.

Beginning with FIG. 15, a front caster wheel 119 is coupled to the chassis 101. In this embodiment, the front caster wheel 119 includes a mounting post 1529 extending vertically from the caster 1501 of the front caster wheel 119. The mounting post 1529 inserts into a sleeve 1507 coupled to the undercarriage 106 of the chassis 101. A threaded retention device 1508 couples the mounting post 1529 into the sleeve 1507. In this illustrative embodiment, the threaded retention device 1508 comprises a handle to enable tool-less rotation of the threaded retention device 1508 to couple, or release, the mounting post 1529 within the sleeve 1507.

Turning now to FIG. 16, illustrated therein is the front caster wheel 119 when removed from the undercarriage 106. As shown in FIG. 16, the distally extending finger levers 1516 have allowed a user to rotate the threaded retention device 1508 without the use of tools to release it from a coupling device 1607. The threaded retention device 1508 thus allows quick, tool-less removal of the front caster wheel 119 from the sleeve 1507 of the undercarriage 106. The front caster wheel 119 can be reattached to the undercarriage 106 by inserting the mounting post 1529 into the sleeve 1507, inserting the threaded retention device 1508 into an aperture 1611 of the sleeve 1507, and finger-twisting the threaded retention device 1508 into the coupling device 1607.

Figure 17:
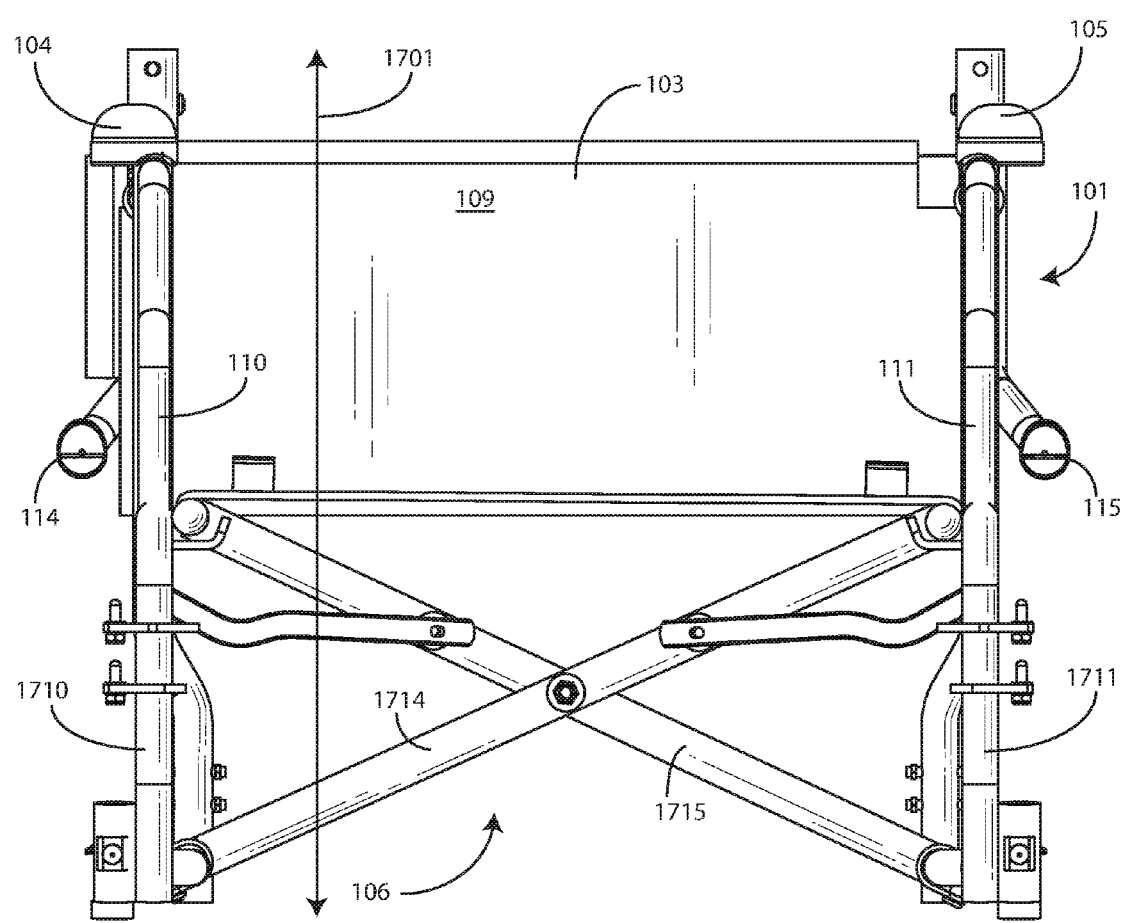
FIG. 17 illustrates a front elevation view of one explanatory wheelchair with its wheels removed and in a partially collapsed position in accordance with one or more embodiments of the disclosure.
Figure 18:
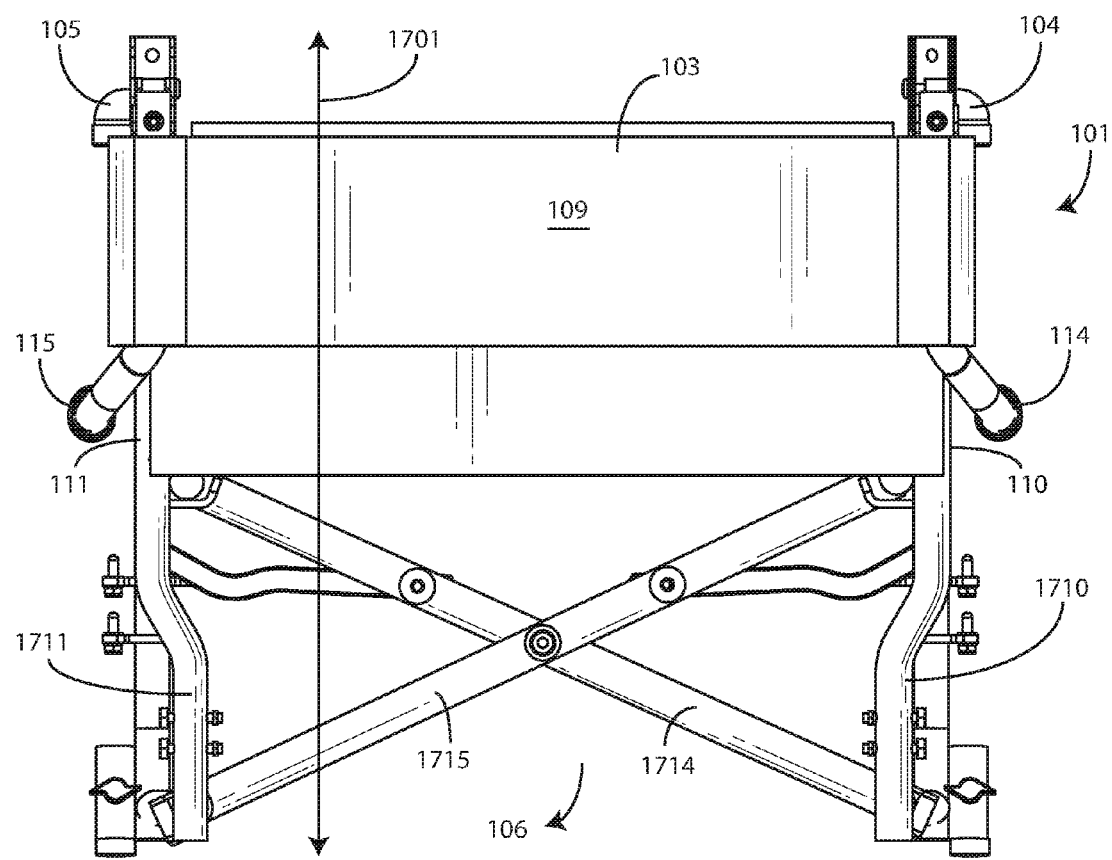
FIG. 18 illustrates a rear elevation view one explanatory wheelchair with its wheels removed and in a partially collapsed position in accordance with one or more embodiments of the disclosure.
Figure 19:
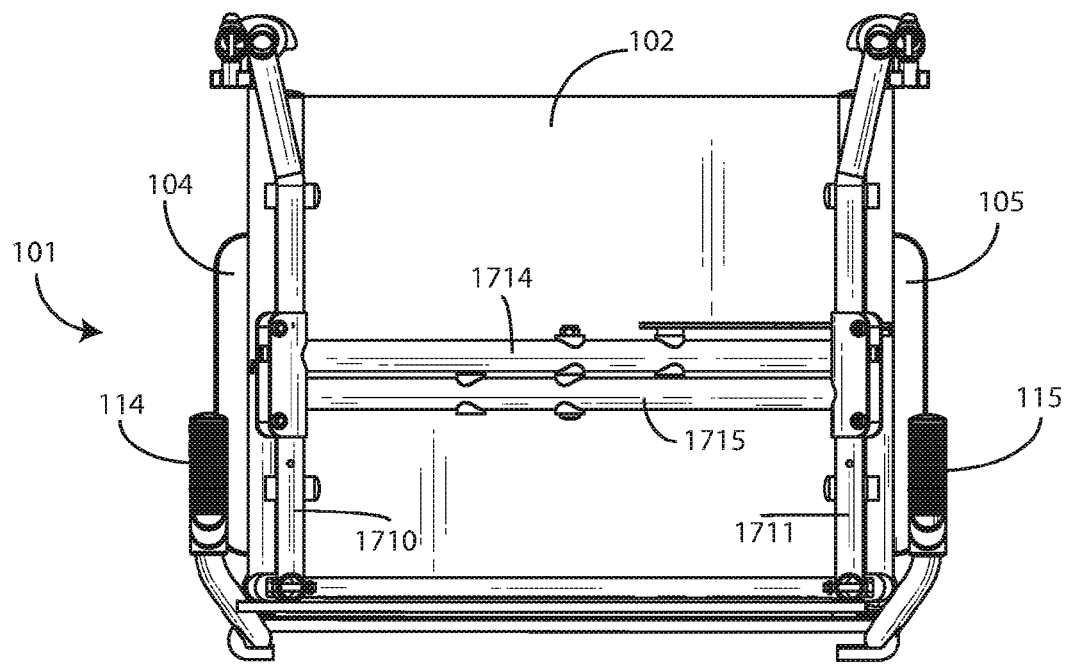
FIG. 19 illustrates a bottom plan view of one explanatory wheelchair with its wheels removed and in a partially collapsed position in accordance with one or more embodiments of the disclosure.
Figure 20:
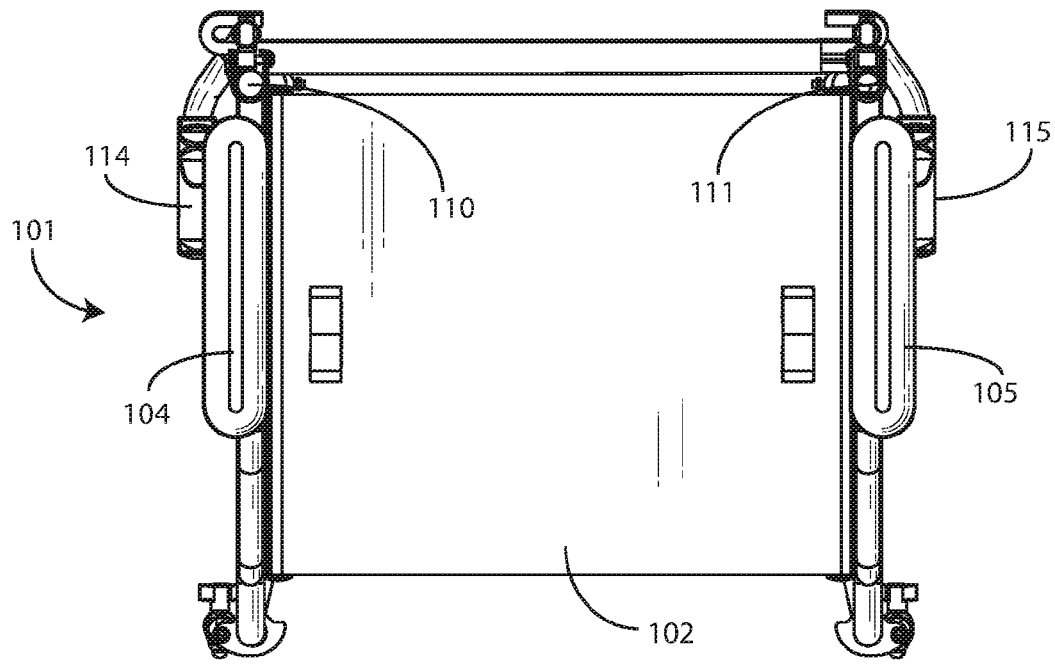
FIG. 20 illustrates a top plan view of one explanatory wheelchair with its wheels removed and in a partially collapsed position in accordance with one or more embodiments of the disclosure.
Figure 21:
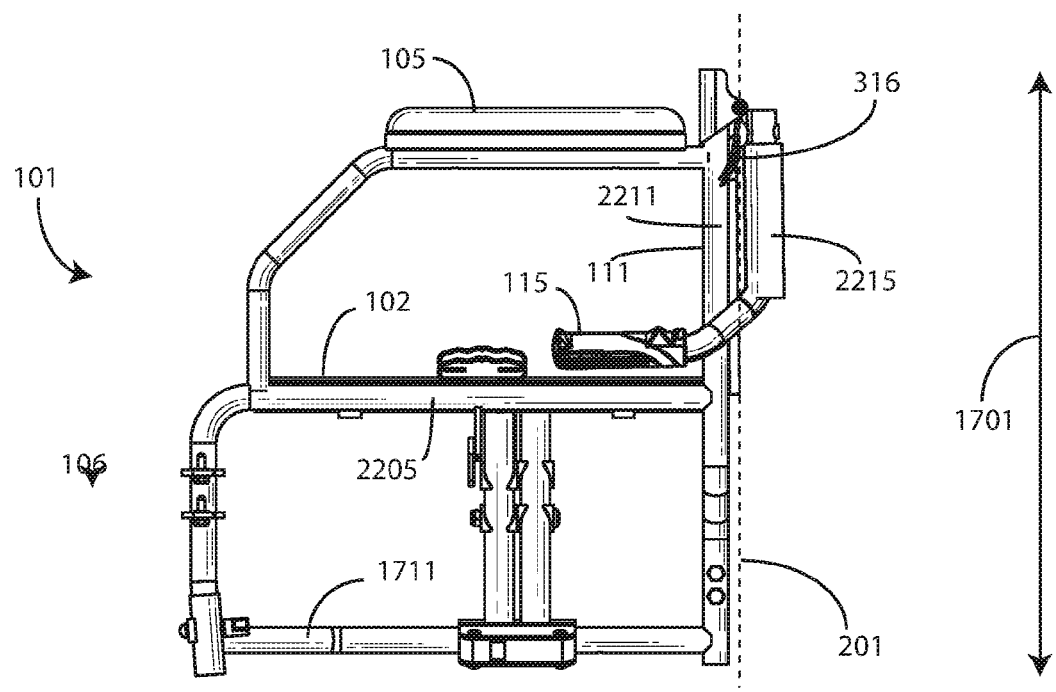
FIG. 21 illustrates a side elevation view of one explanatory wheelchair with its wheels removed and in a partially collapsed position in accordance with one or more embodiments of the disclosure.
Figure 22:
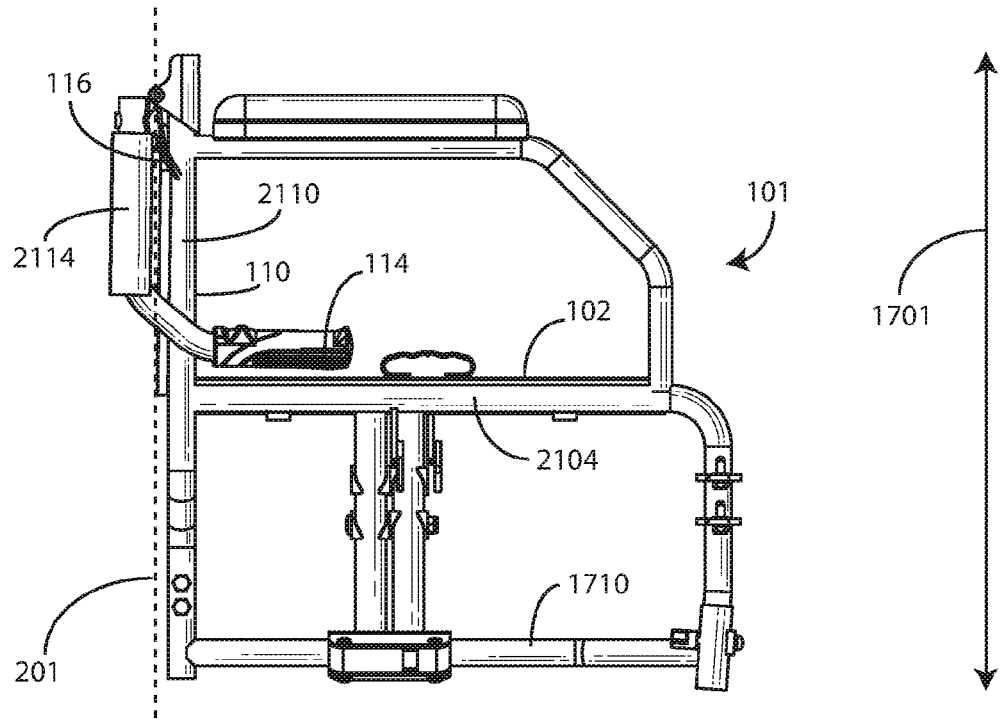
FIG. 22 illustrates another side elevation view of one explanatory wheelchair with its wheels removed and in a partially collapsed position in accordance with one or more embodiments of the disclosure.
Figure 23:
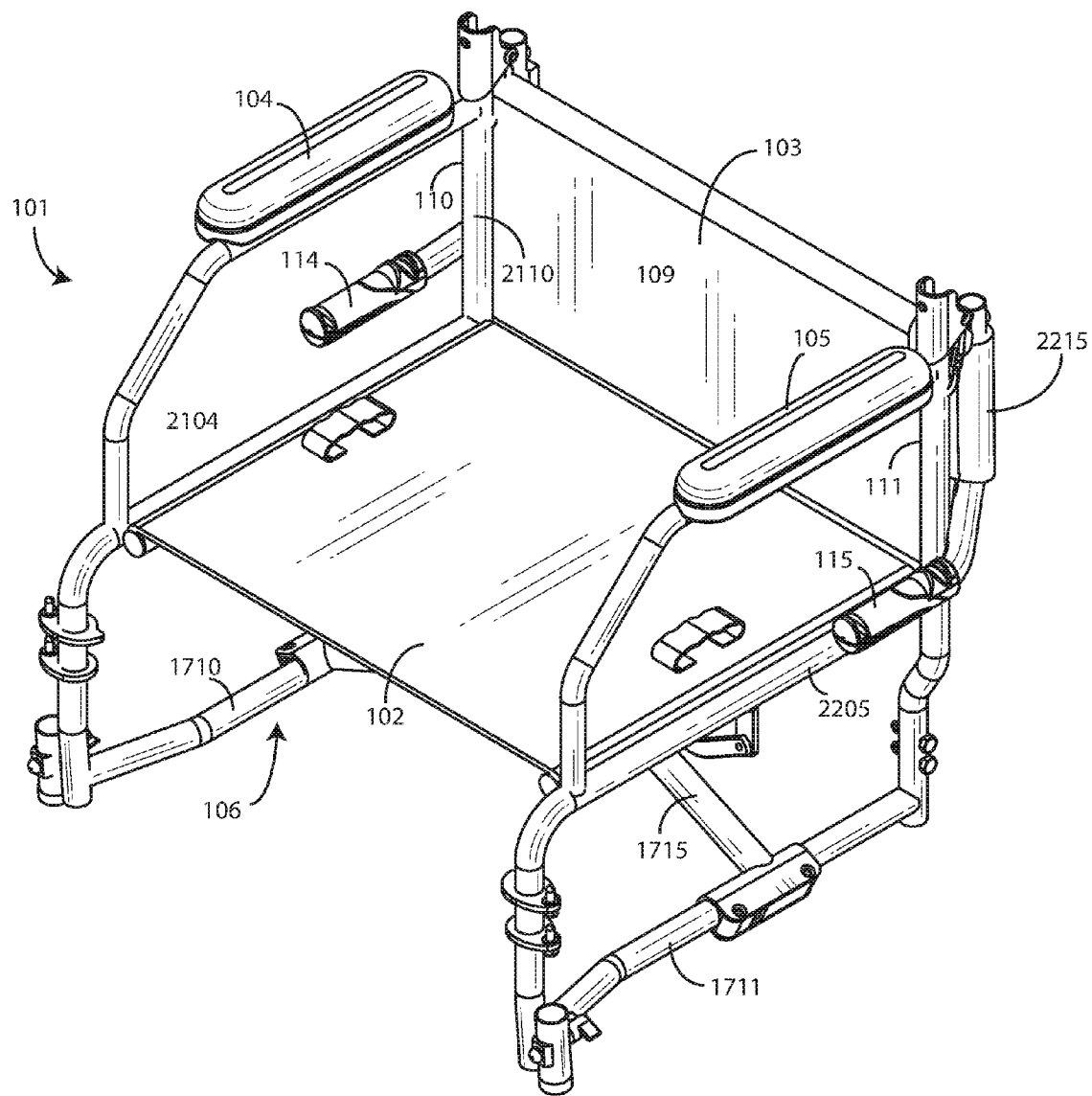
FIG. 23 illustrates a perspective view of one explanatory wheelchair with its wheels removed and in a partially collapsed position in accordance with one or more embodiments of the disclosure.
Figure 24:
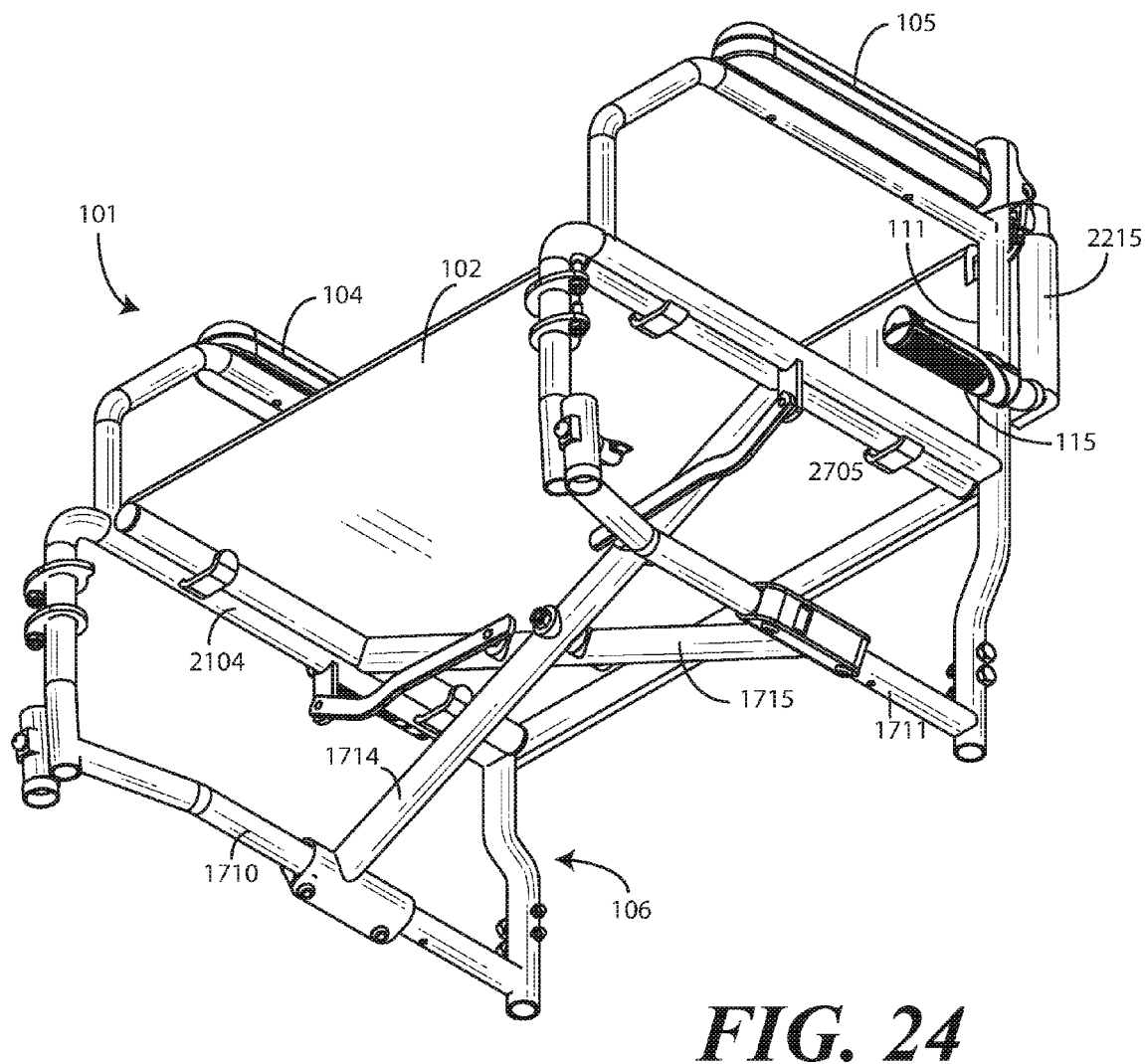
FIG. 24 illustrates another perspective view of one explanatory wheelchair with its wheels removed and in a partially collapsed position in accordance with one or more embodiments of the disclosure.

Turning now to FIGS. 17-24, illustrated therein are views of the chassis 101 once the one or more front caster wheels (118,119), the one or more rear wheel assemblies (120,121), and the one or more detachable footrests (122,123) have been removed from the chassis 101. FIG. 17 illustrates a front elevation view of the chassis 101, while FIG. 18 illustrates a rear elevation view of the chassis 101. FIG. 19 illustrates a bottom plan view of the chassis 101, while FIG. 20 illustrates a top plan view of the chassis 101. FIG. 22 illustrates a left side elevation view of the chassis 101, while FIG. 23 illustrates a right side elevation view of the chassis 101. FIG. 23 illustrates a first perspective view of the chassis 101, while FIG. 24 illustrates a second perspective view of the chassis 101. From these various views, when viewed collectively, each and every element of the chassis 101 is visible.

Recall from the discussion of FIGS. 1-10 above that in one or more embodiments, the vertical side members 110, 111 defining the rear side 201 of the wheelchair (100) have extending therefrom two push handles 114,115 with which a user can push the wheelchair when a patient is seated on the seat 102. To make things more compact when the wheelchair is collapsed, the two push handles 114,115 are collapsible, i.e., can fold downward to be adjacent to the vertical side members 110,111.

As shown in FIGS. 17-24, in this embodiment an upper portion 2114,2215 of the vertical side member 110,111 folds downward to be adjacent to, and substantially parallel with, a lower portion 2210,2211 of the vertical side member 110,111. This results in the two push handles 114,115 again being substantially orthogonal with the vertical side members 110,111, namely, being substantially orthogonal with the lower portions 2210,2211 of the vertical side members 110,111. However, they are pointing in a direction opposite that in which they are pointing in FIGS. 1-10. This folding is selective by toggling the two locking switch levers 116,316 to collapse the push handles 114,115 as previously described.

Folding down the upper portion 2114,2215 of the vertical side member 110,111 along with the two push handles 114,115 reduces the overall height 1701 of the chassis 101 where the height 1701 is defined by the chassis dimension oriented substantially orthogonally with the seat 102. This folding is one step in reducing the overall dimensions of the chassis 101, when completely folded, to be less than twenty-four inches by less than twenty-two inches, by less than ten inches. In one embodiment, the folded chassis reduces to having a length of about twenty-three inches, a width of about twenty-one inches, and a height of about nine inches.

Figure 25:
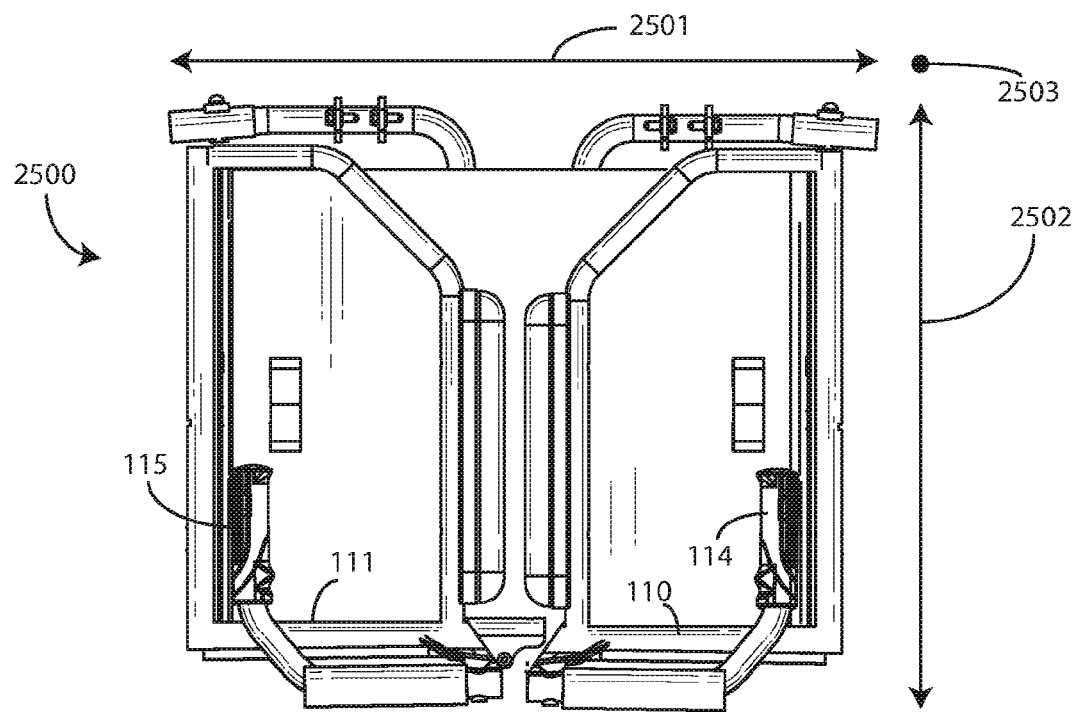
FIG. 25 illustrates a top plan view of one explanatory wheelchair with its wheels removed and in a fully collapsed position in accordance with one or more embodiments of the disclosure.
Figure 26:
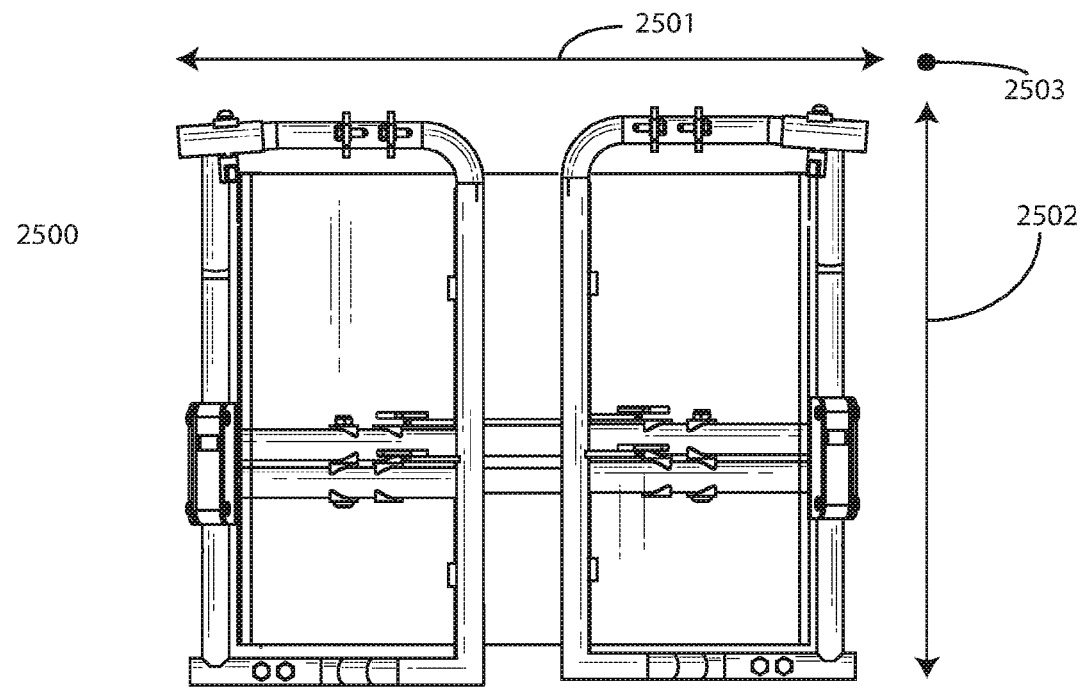
FIG. 26 illustrates a bottom plan view of one explanatory wheelchair with its wheels removed and in a fully collapsed position in accordance with one or more embodiments of the disclosure.

In one or more embodiments, the one or more armrests 104,105 and the backrest 103 are foldable atop the seat 102. For example, where the backrest 103 is defined by a layer of material 109, the material can collapse when the one or more armrests 104,105 fold about horizontal tubes 2104,2205 disposed at the bottom of the one or more armrests 104,105. Similarly, in one embodiment, the undercarriage 106 can fold beneath the seat 102. When both the one or more armrests 104,105 and the undercarriage 106 are folded atop and beneath the seat 102, respectively, a folded chassis is formed. One example of such a folded chassis is shown in FIGS. 25-26. In this embodiment, two side members 1710, 1711 of the undercarriage 106 are separated by folding supports 1714,1715 that allow the side members 1710,1711 of the undercarriage 106 to collapse together beneath the seat.

Turning now to FIGS. 25-26, illustrated therein is the resulting folded chassis 2500. The folded chassis 2500 is shown in top plan view in FIG. 25, and in bottom plan view in FIG. 26. Due to the removal of the one or more front caster wheels (118,119), the one or more rear wheel assemblies (120,121), and the one or more detachable footrests (122,123), and the collapsing of the vertical side members 110,111 and push handles 114,115, the folded chassis 2500 advantageously has a length 2501 of less than twenty-four inches, a width 2502 of less than twenty-two inches, and a height 2503 (measured into the page as viewed in FIGS. 25-26) less than ten inches. In this illustrative embodiment, the length 2501 is less than twenty-three inches, the width 2502 is less than twenty-one inches, and the height 2503 is less than nine inches. Advantageously, this allows the folded chassis 2500 to be placed in a package that fits on a retailer's shelf in accordance with their predefined size requirements. Such a package 2700 is shown in FIG. 27.

Figure 27:
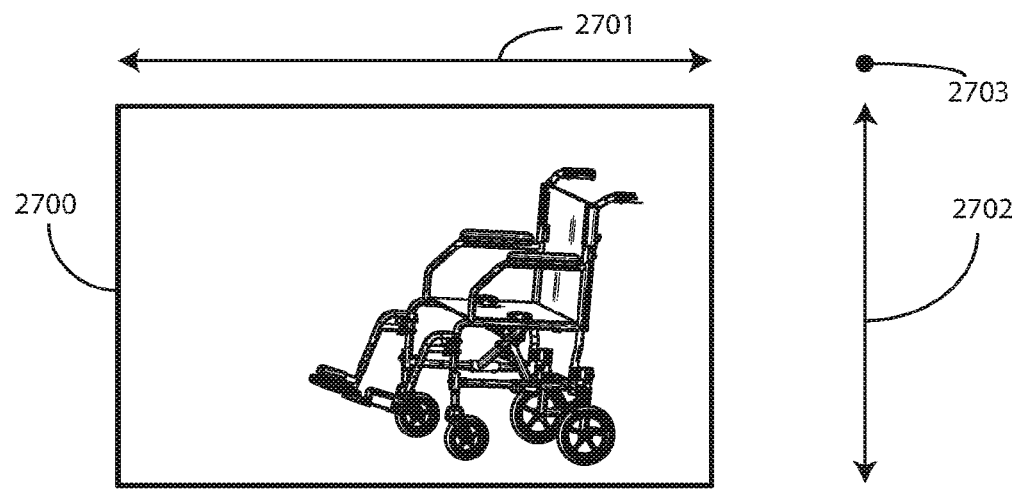
FIG. 27 illustrates one explanatory wheelchair with its wheels removed and in a fully collapsed position in a package in accordance with one or more embodiments of the disclosure.

Turning now to FIG. 27, this package has a length 2701 of about twenty-three inches, a width 2702 of about twenty-one inches, and a height 2703 of about nine inches. Most drugstore and big-box retailers are more than willing to place packages 2700 of this size on their shelves. Accordingly, a user can see and select the folded chassis (2500) as an in-store, off-the-shelf purchase. The one or more front caster wheels (118,119), the one or more rear wheel assemblies (120,121), and the one or more detachable footrests (122,123) can be packages separately, stored off-shelf at the retailer, and delivered to the purchaser at check-out.

Figure 28:
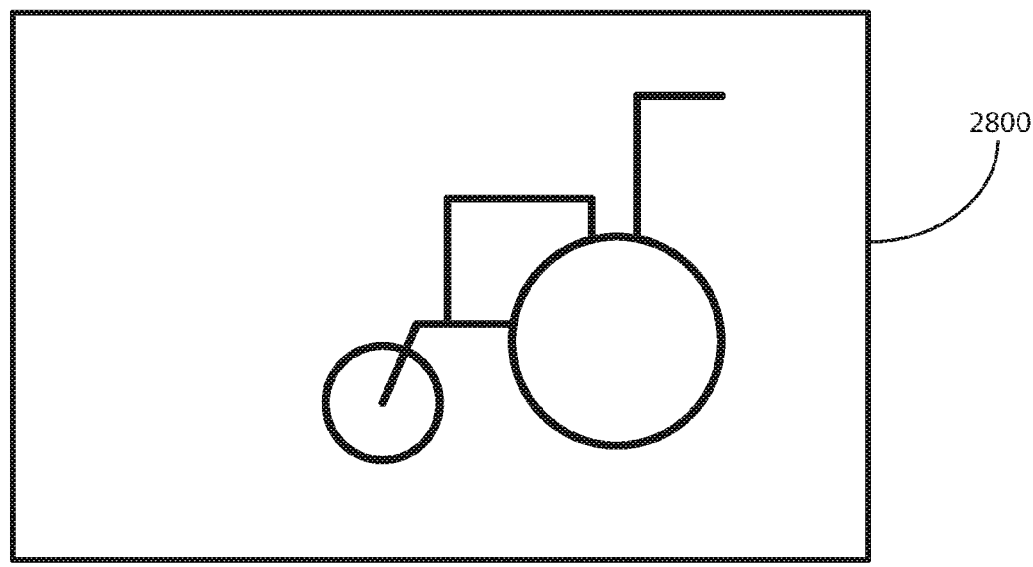
FIG. 28 illustrates a prior art wheelchair in a package.

By contrast, as shown in FIG. 28, prior art packages 2800 have—at their smallest—a length 2801 of thirty-two inches, a height 2803 of nine inches, and a width 2802 of twenty-three inches. Retailers generally do not allow such package sizes to be placed on their shelves. Accordingly, embodiments of the present disclosure provide over a thirty-percent reduction in package size, advantageously allowing retailers to display previously un-displayable products on their shelves.

While removal of the one or more front caster wheels (118,119), the one or more rear wheel assemblies (120,121), and the one or more detachable footrests (122,123) is one way to reduce the folded chassis size, embodiments of the disclosure are not so limited. FIGS. 29-32 illustrate other techniques for reducing the size of a folded chassis sufficiently to allow retailers to display the folded chassis in a package on their shelves. Still other variations will be obvious to those of ordinary skill in the art having the benefit of this disclosure.

Figure 29:
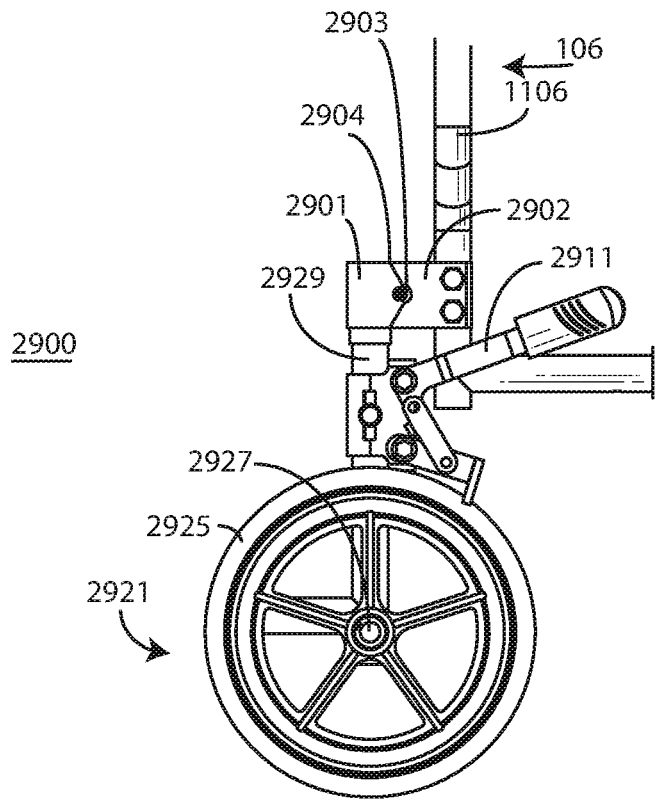
FIG. 29 illustrates another rear wheel assembly in accordance with one or more embodiments of the disclosure.

Beginning with FIG. 29, illustrated therein is one explanatory rear wheel assembly 2921. As shown, the rear wheel assembly 2921 includes a rear wheel 2925, an axle 2927, and a mounting post 2929. This particular rear wheel assembly 2921 also includes a brake assembly 2911 coupled only to the mounting shaft 2929 of the rear wheel assembly 2921 as previously described.

Rather than using a quick release device (131) to couple the rear wheel assembly 2921 to a tubular post 1106 of the undercarriage 106, in this embodiment the rear wheel assembly 2921 is coupled to the tubular post 1106 of the undercarriage 106 by a pivotable connector 2904. The pivotable connector 2904 includes a first portion 2901 and a second portion 2902 that are joined by a hinge pivot 2903. The first portion 2901 can selectively pivot relative to the second portion 2902 about the hinge pivot 2903 to retract from a first position 2900, shown in FIG. 29, to a second position 3000, shown in FIG. 30. Accordingly, when using the pivotable connector 2904, each rear wheel assembly 2921 becomes pivotable about the undercarriage 106 from the first position 2900 to the second position 3000 to reduce a second major dimension of the chassis (101), namely height (1701). One or more locking mechanisms, similar to locking switch lever (116,316) described above can be used to selectively lock each rear wheel assembly 2921 in either the first position 2900 or the second position 3000.

Figure 30:
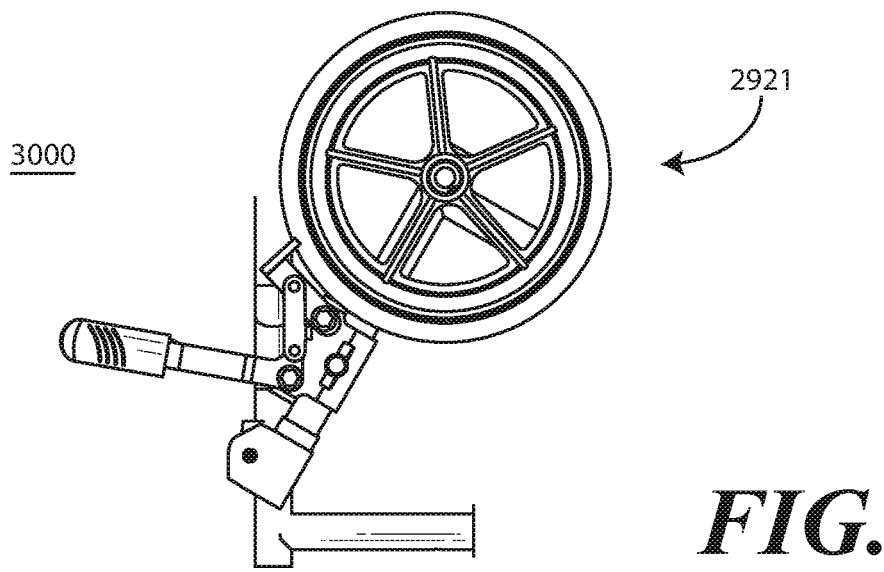
FIG. 30 illustrates another rear wheel assembly in a pivoted position in accordance with one or more embodiments of the disclosure.
Figure 31:
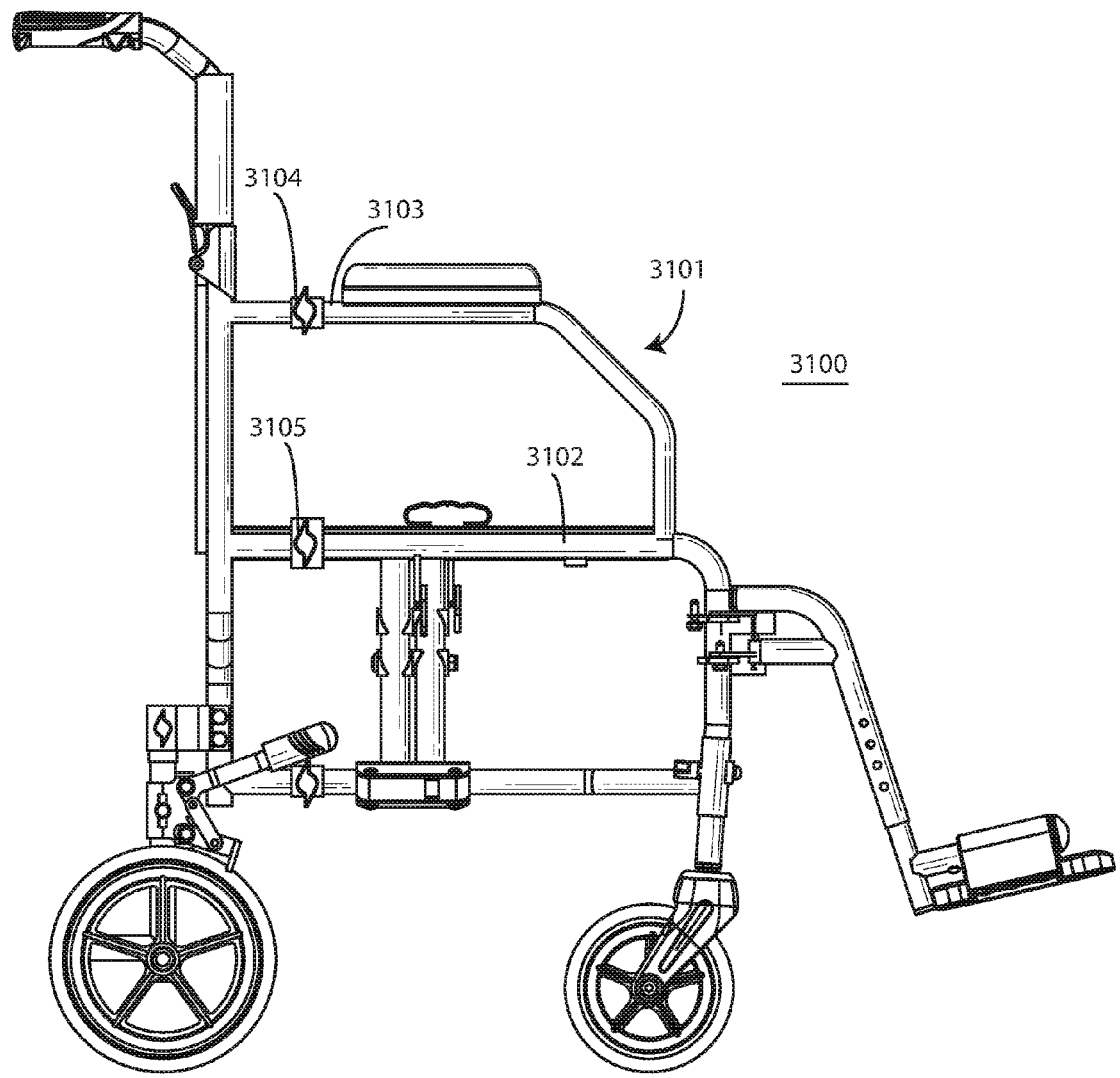
FIG. 31 illustrates yet another explanatory wheelchair in accordance with one or more embodiments of the disclosure.
Figure 32:
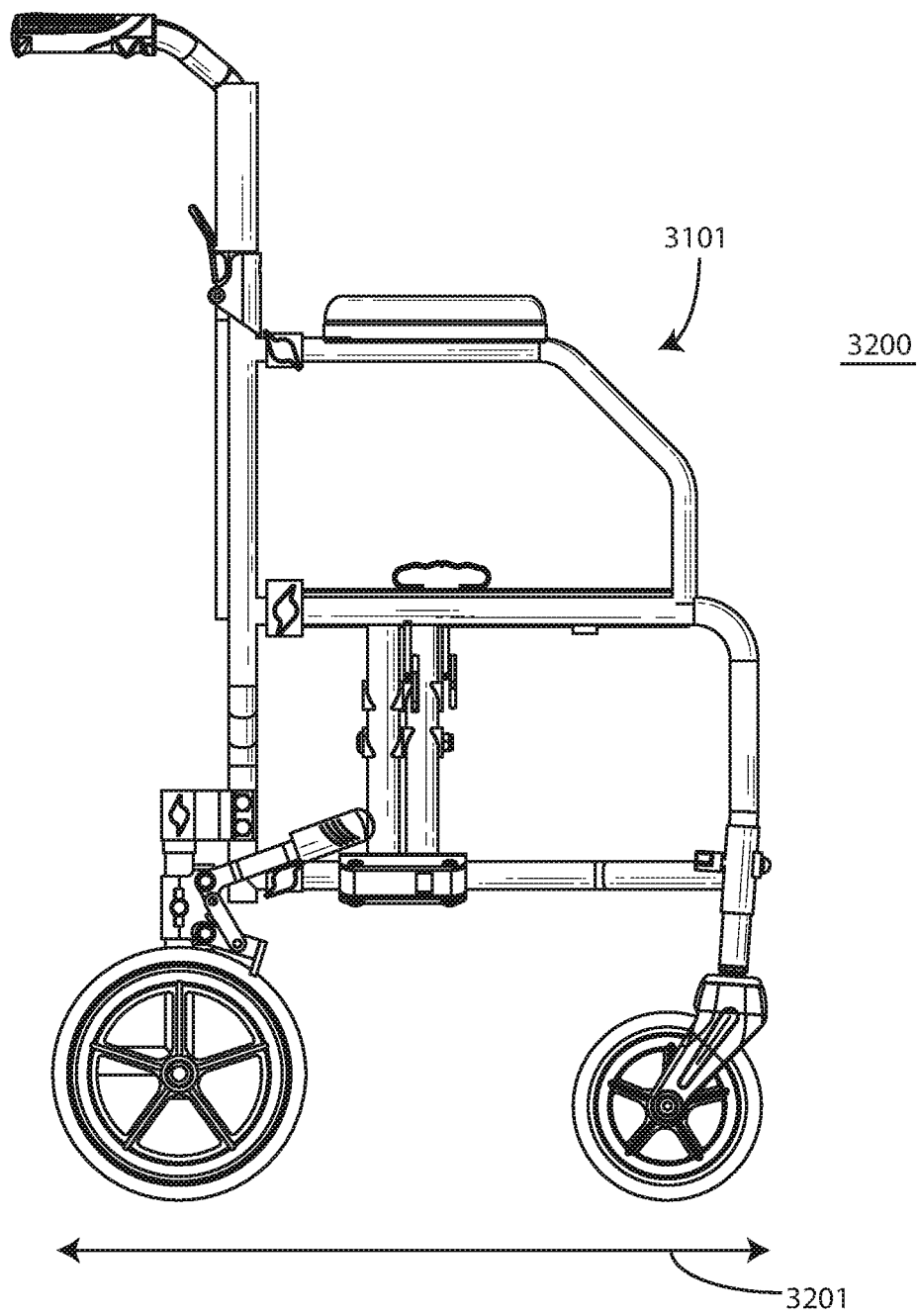
FIG. 32 illustrates yet another explanatory wheelchair in a partially collapsed position in accordance with one or more embodiments of the disclosure.
Figure 33:
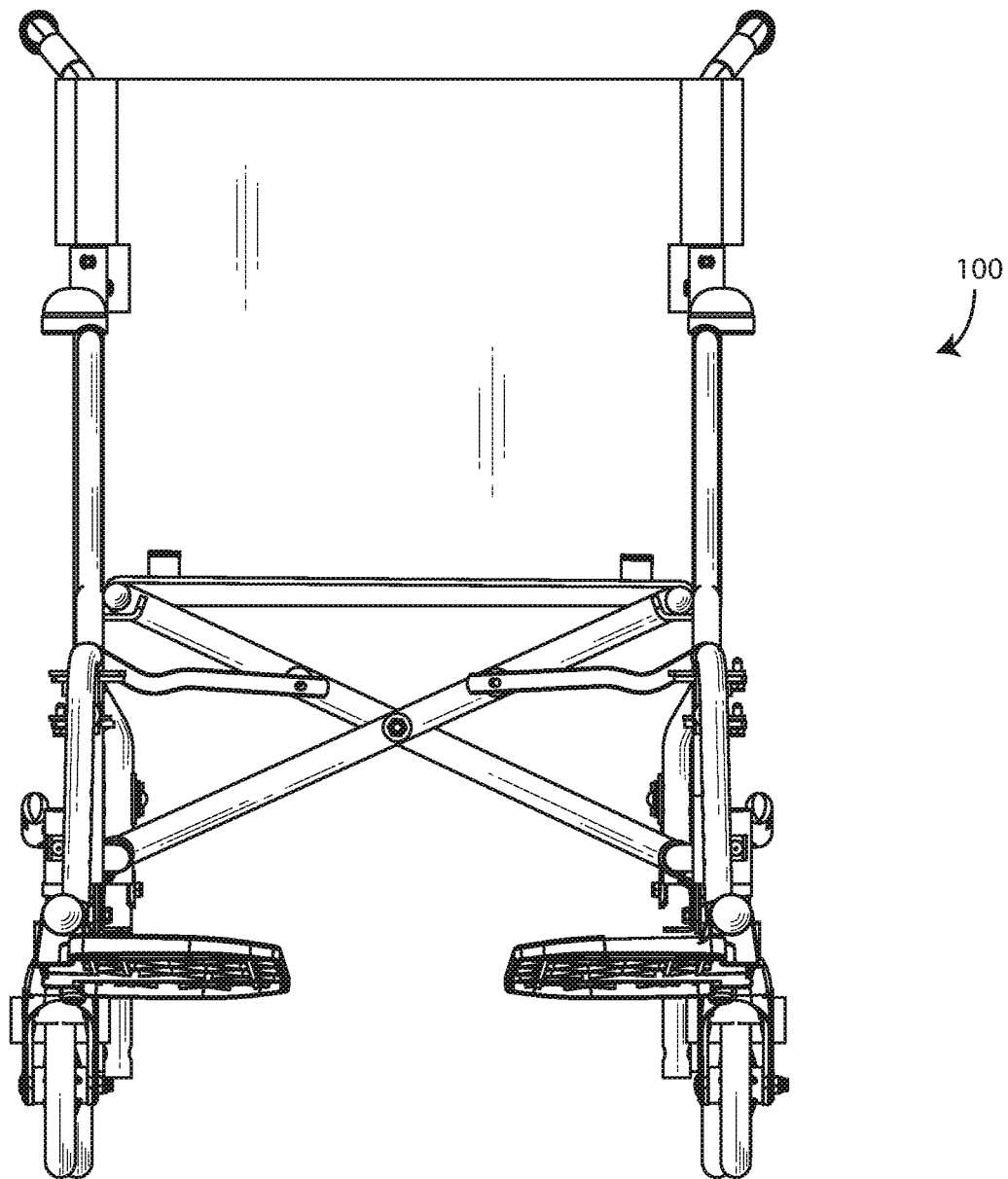
FIGS. 33-50 illustrate various ornamental appearances of wheelchairs and chassis configured in accordance with one or more embodiments of the disclosure.
Figure 34:
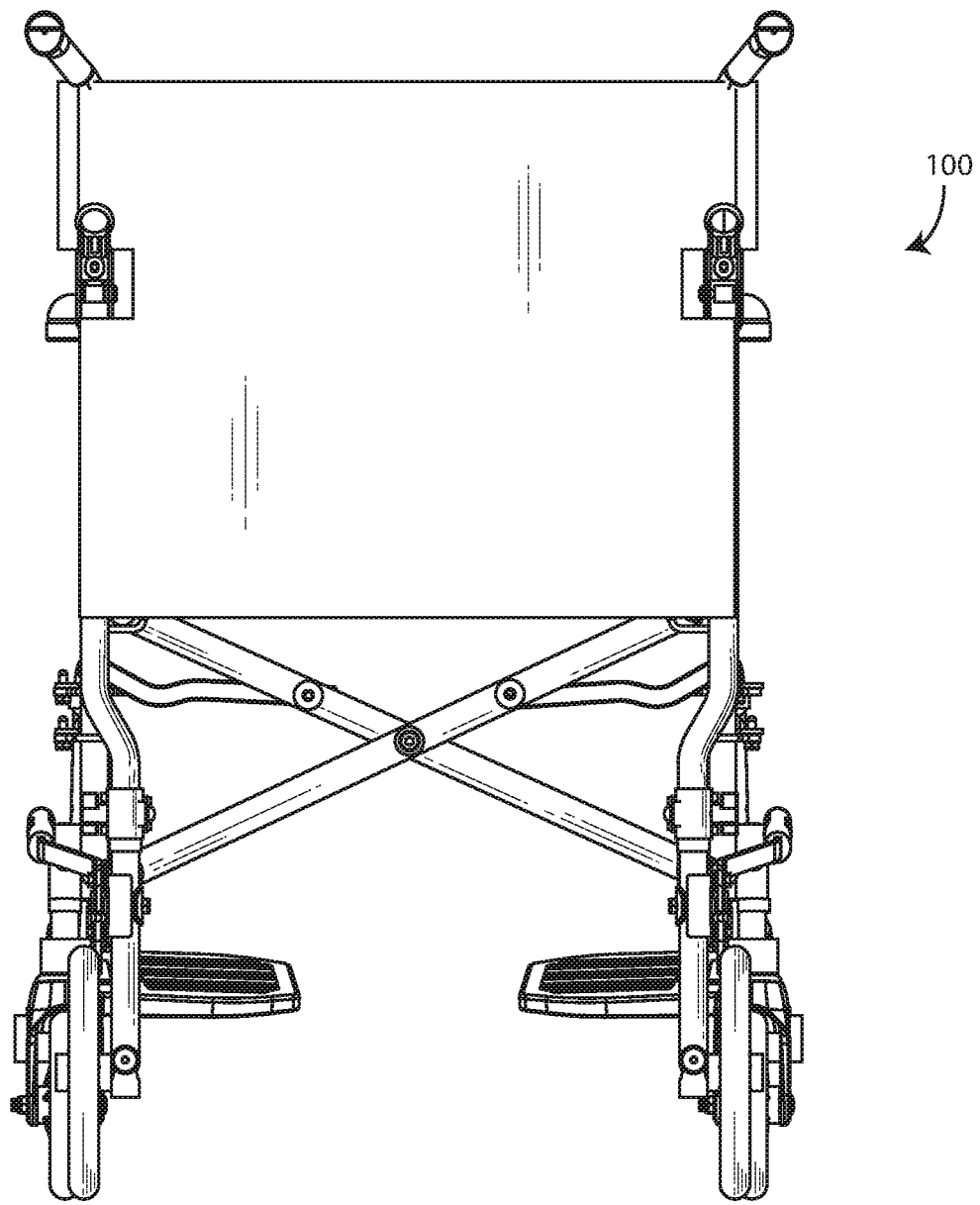
Figure 35:
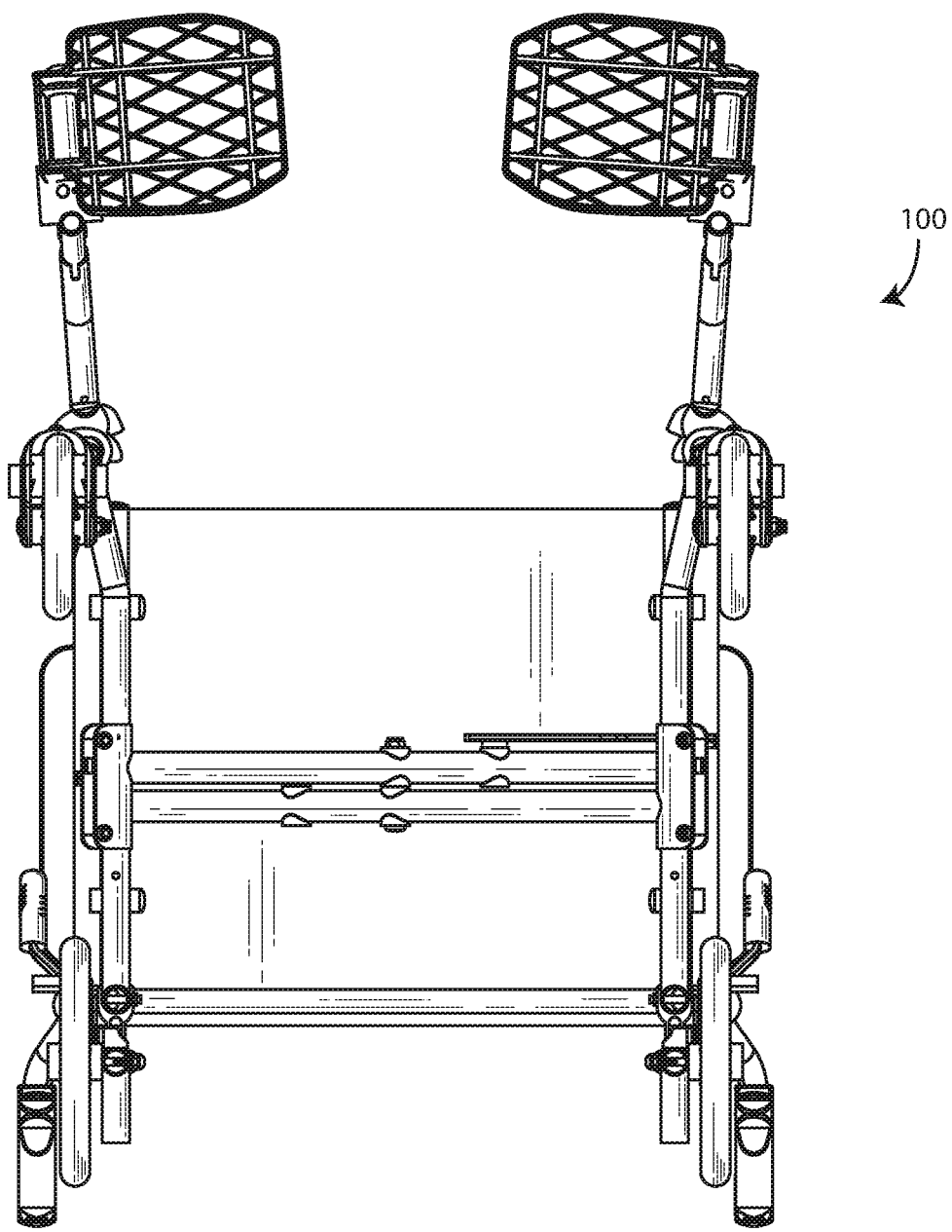
Figure 36:
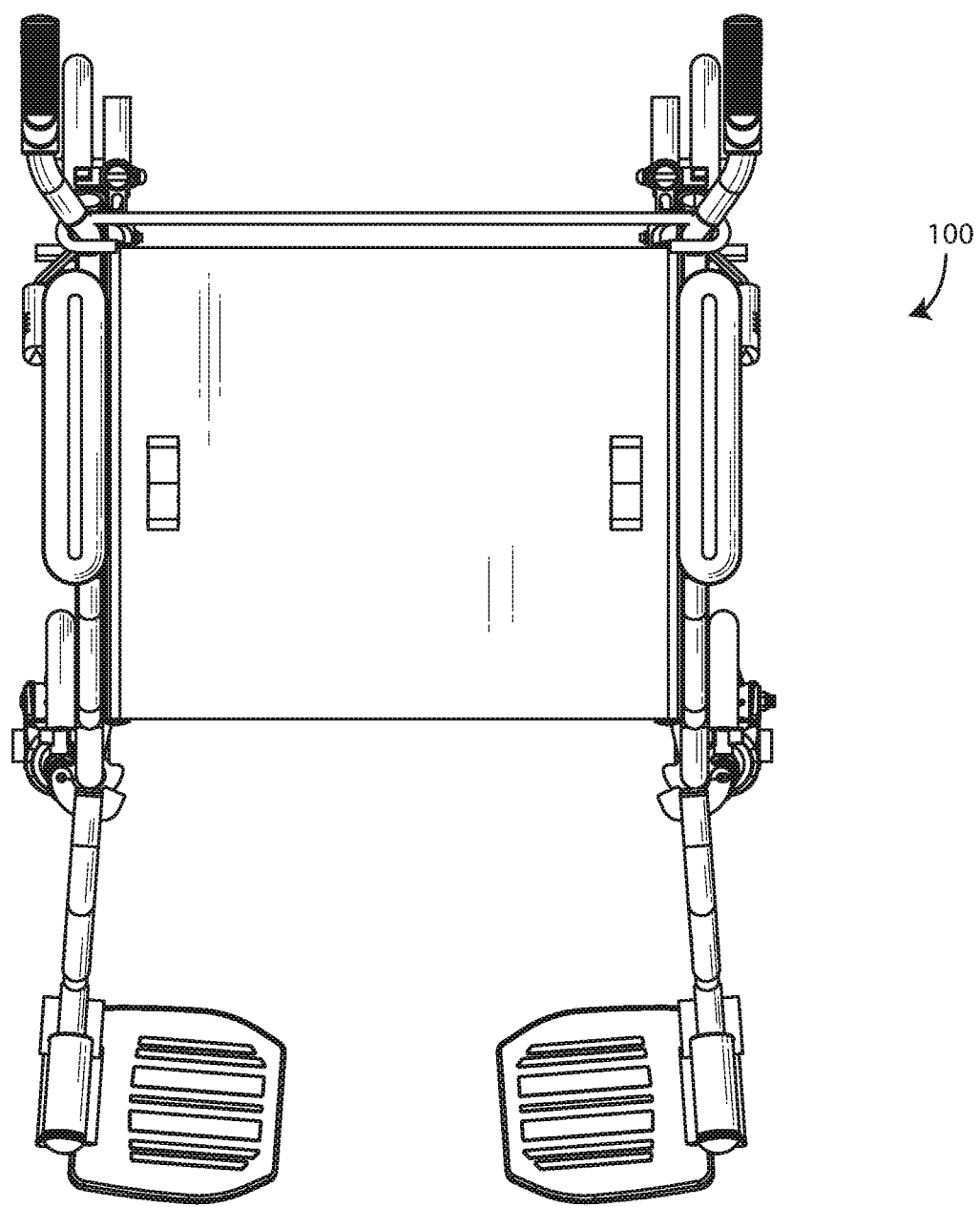
Figure 37:
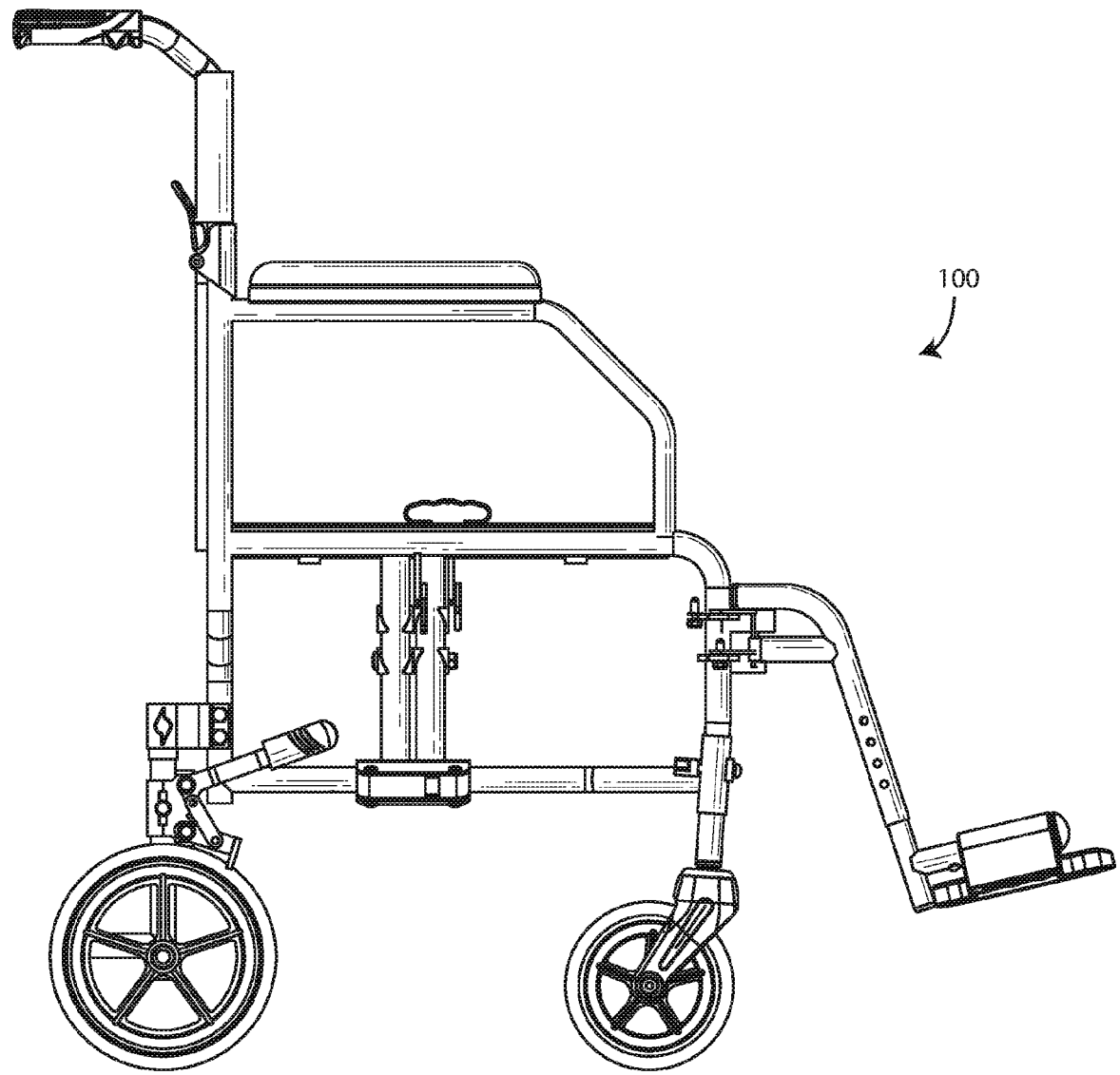
Figure 38:
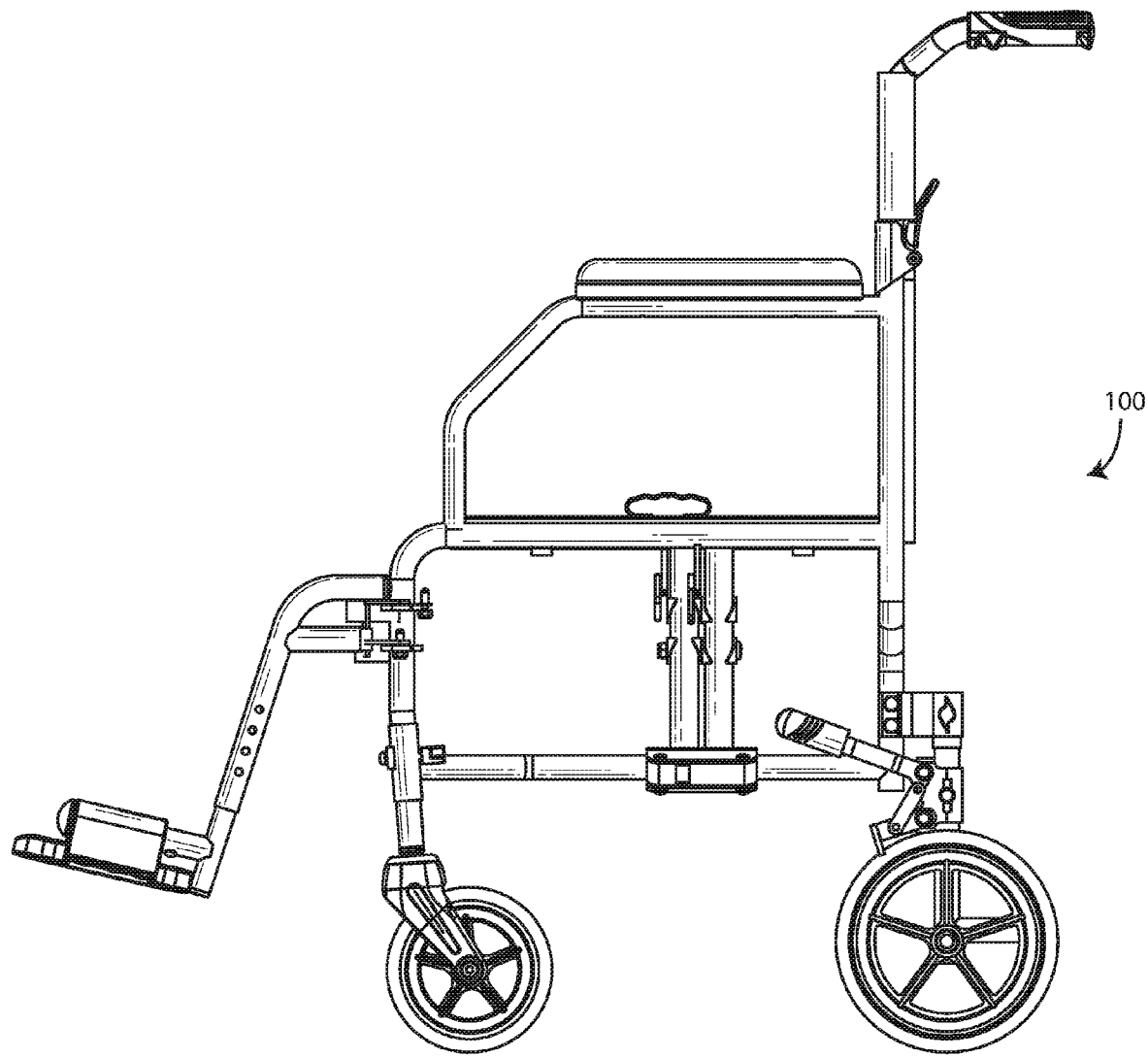
Figure 39:
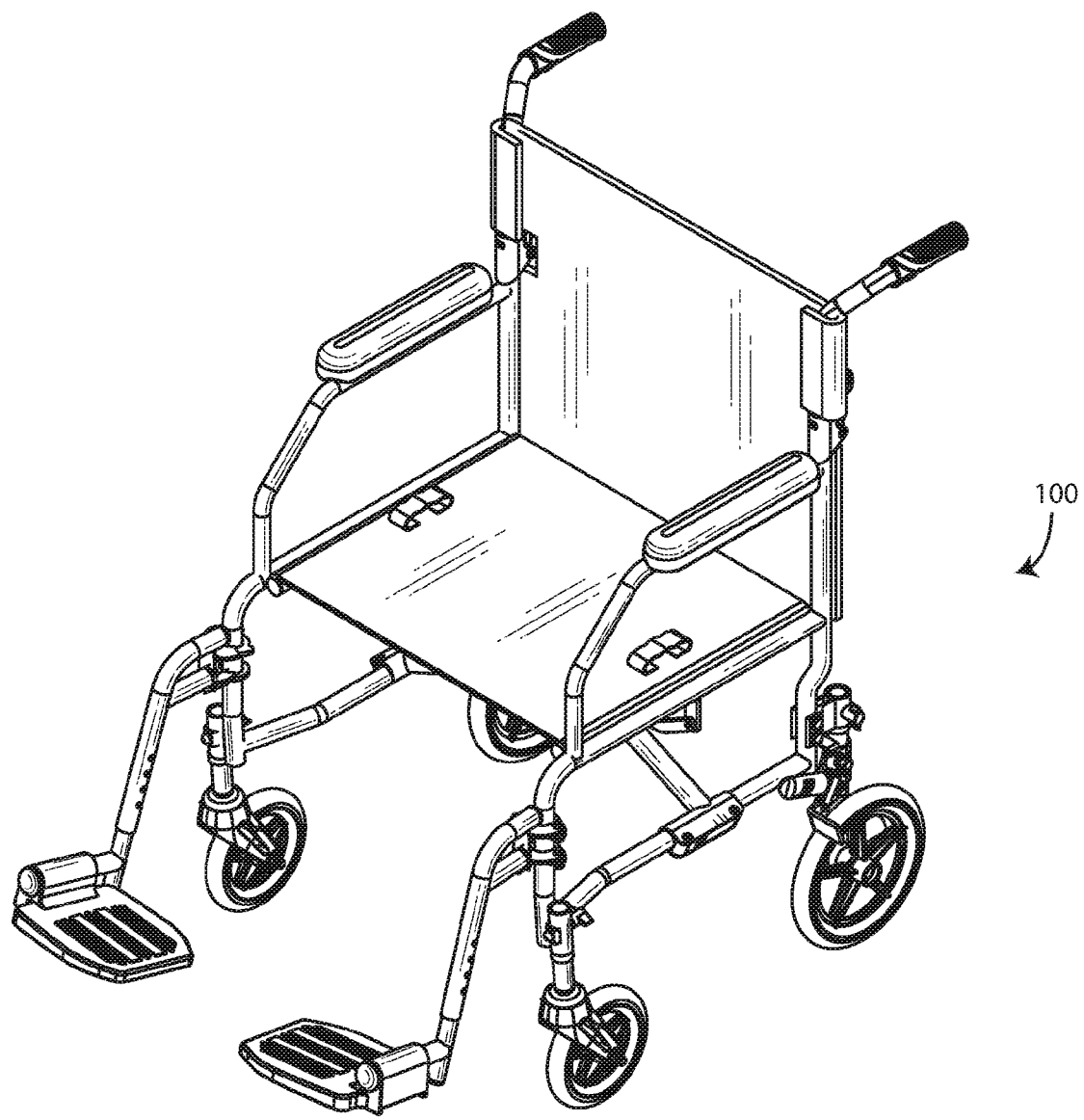
Figure 40:
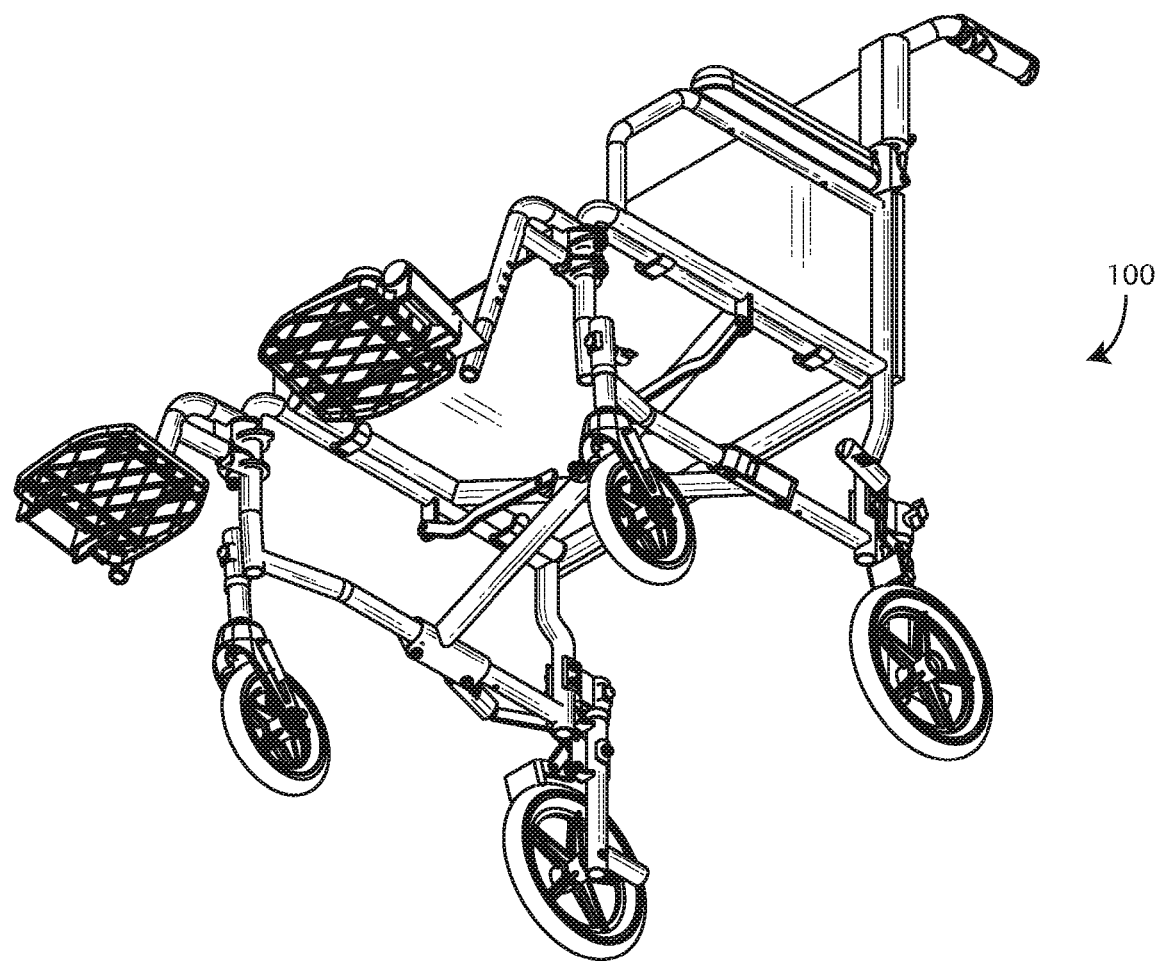
Figure 41:
Figure 42:
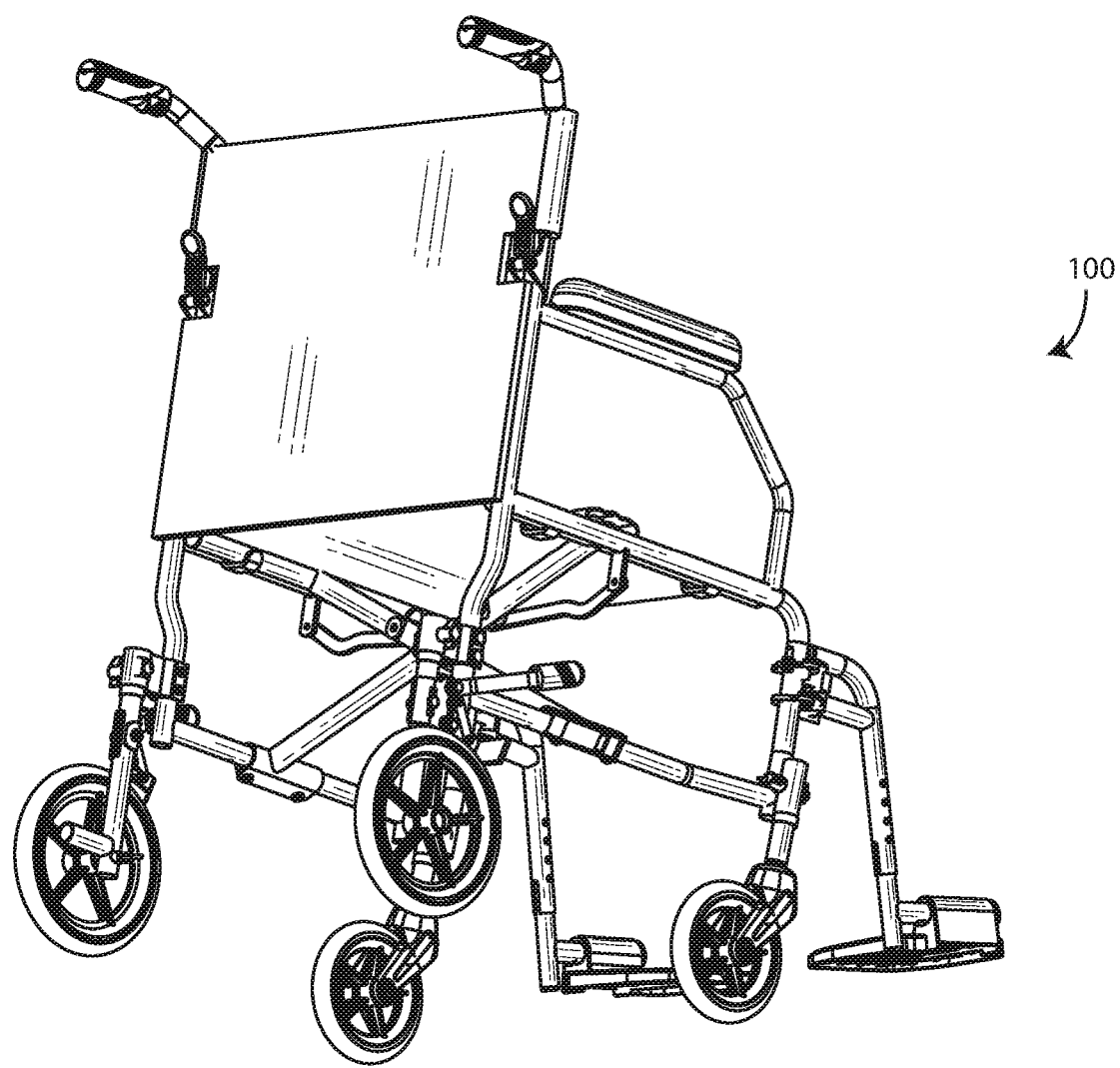
Figure 43:
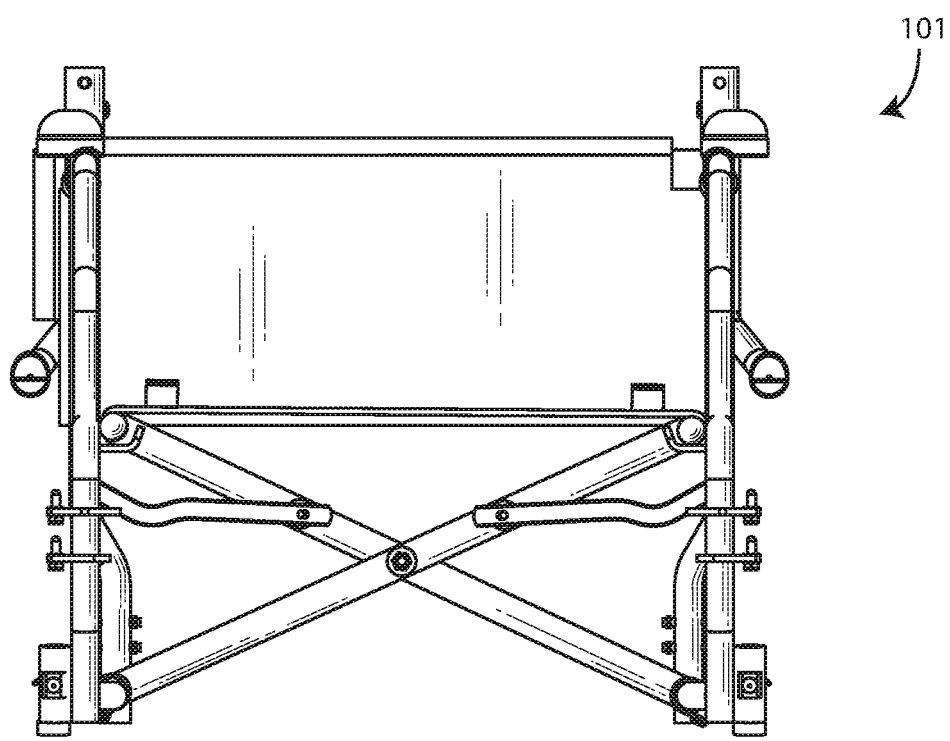
Figure 44:
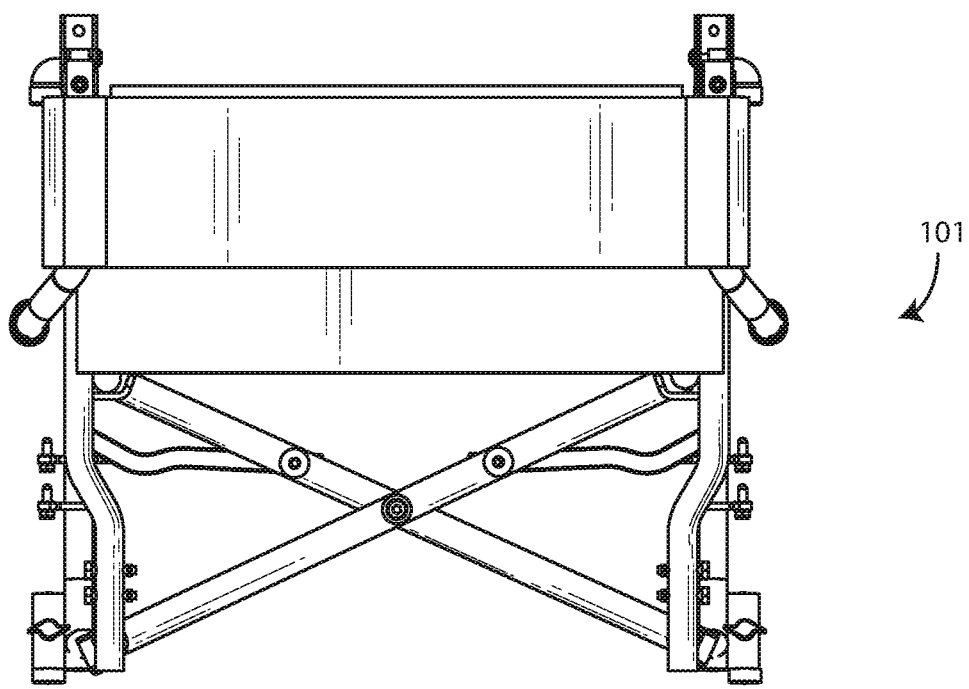
Figure 45:
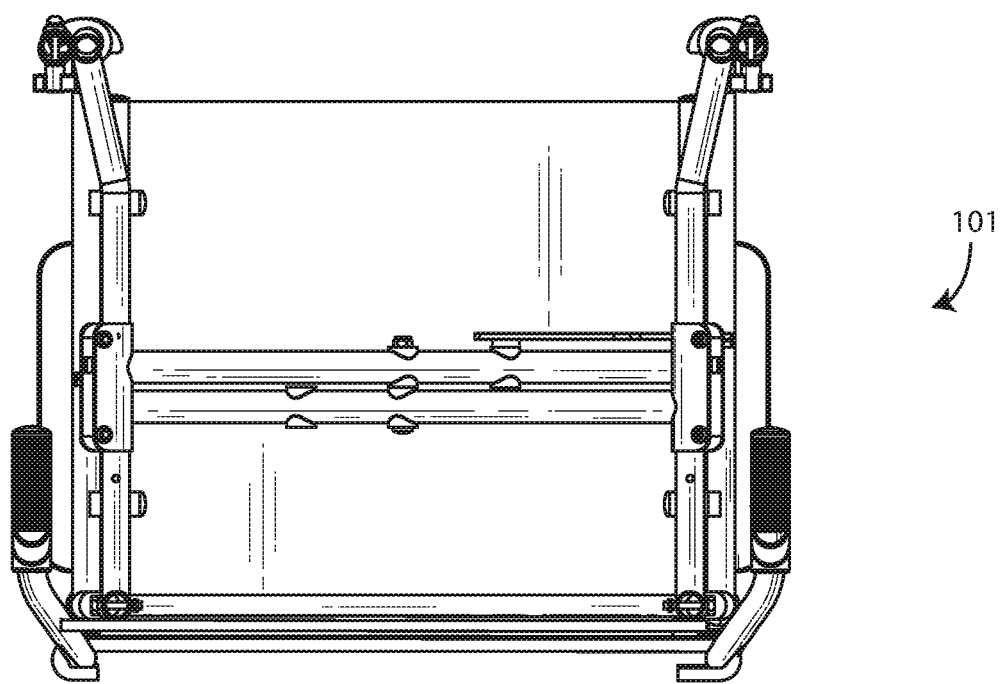
Figure 46:
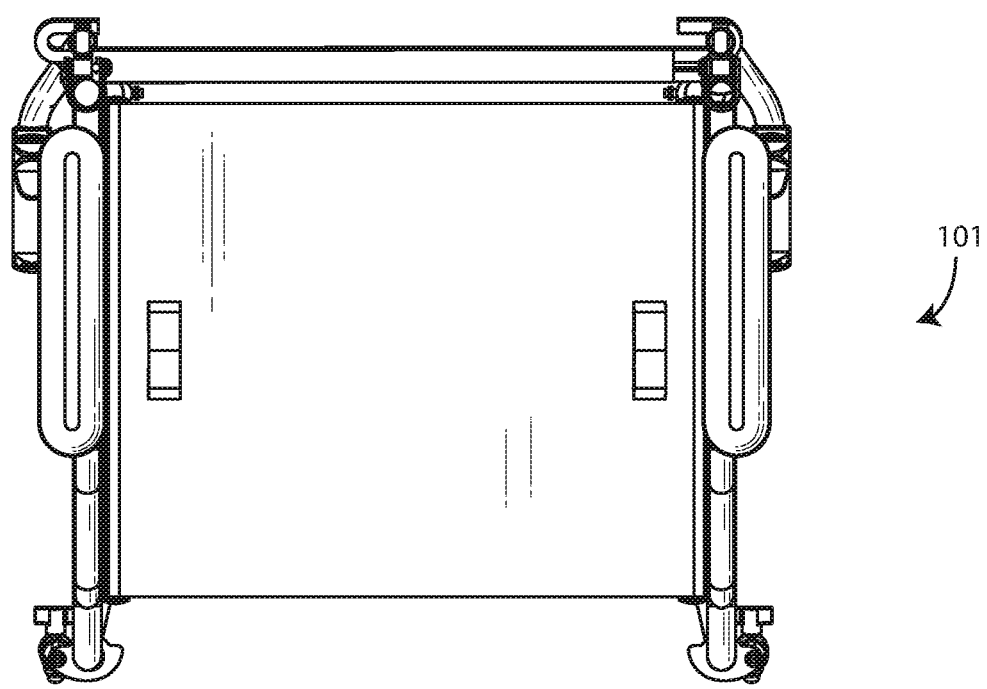
Figure 47:
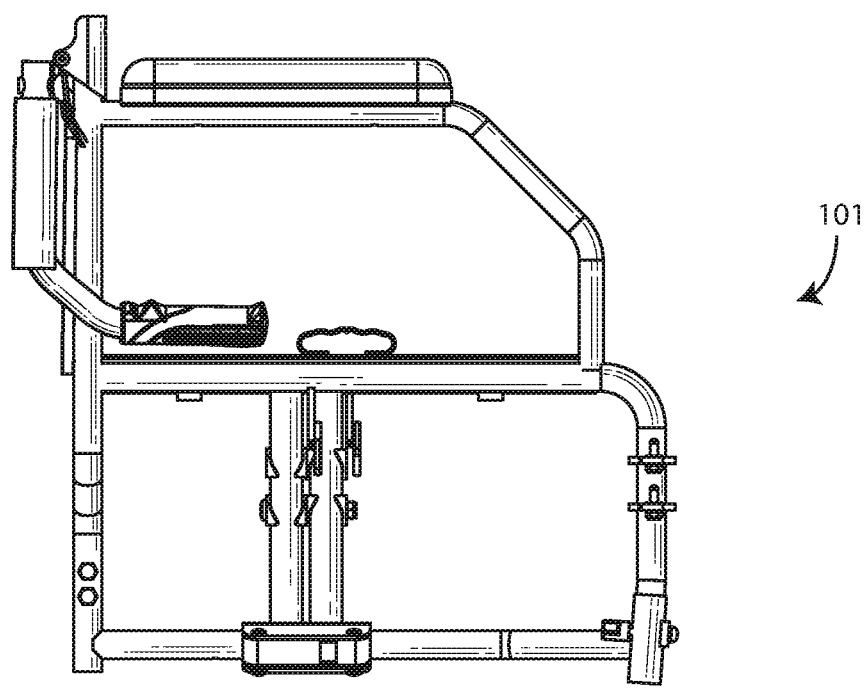
Figure 48:
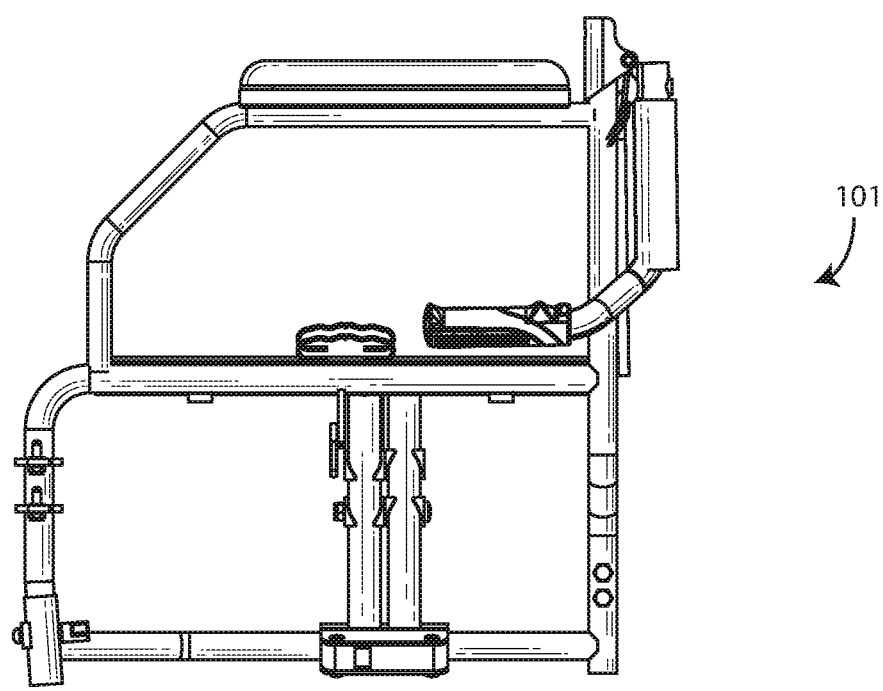
Figure 49:
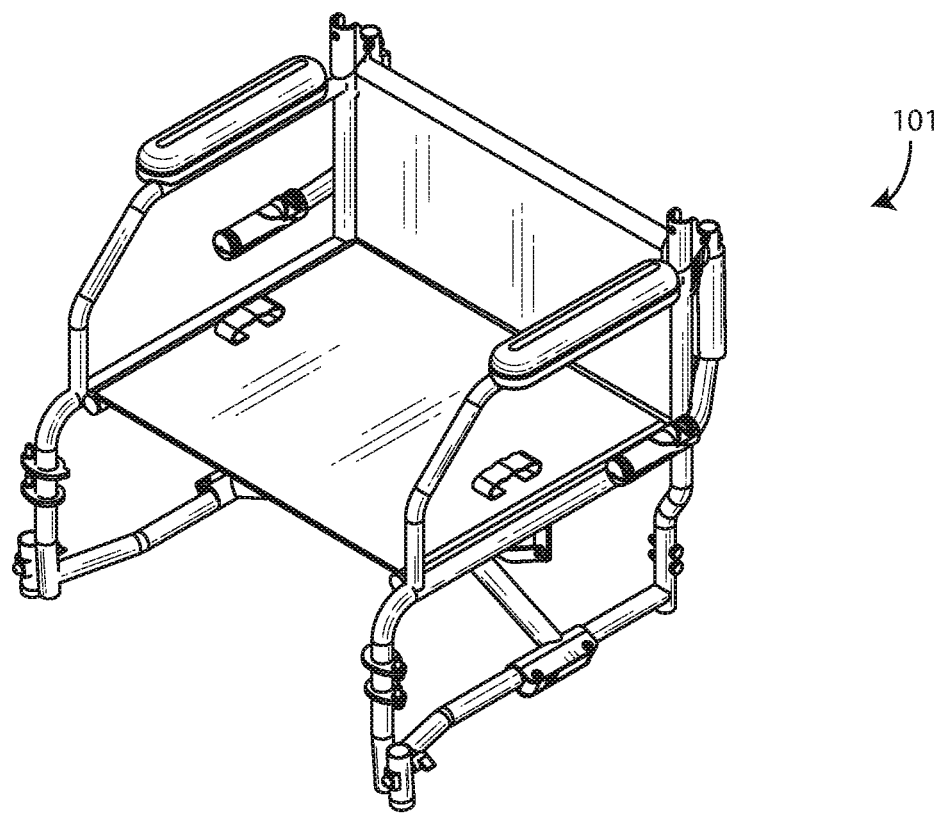
Figure 50:
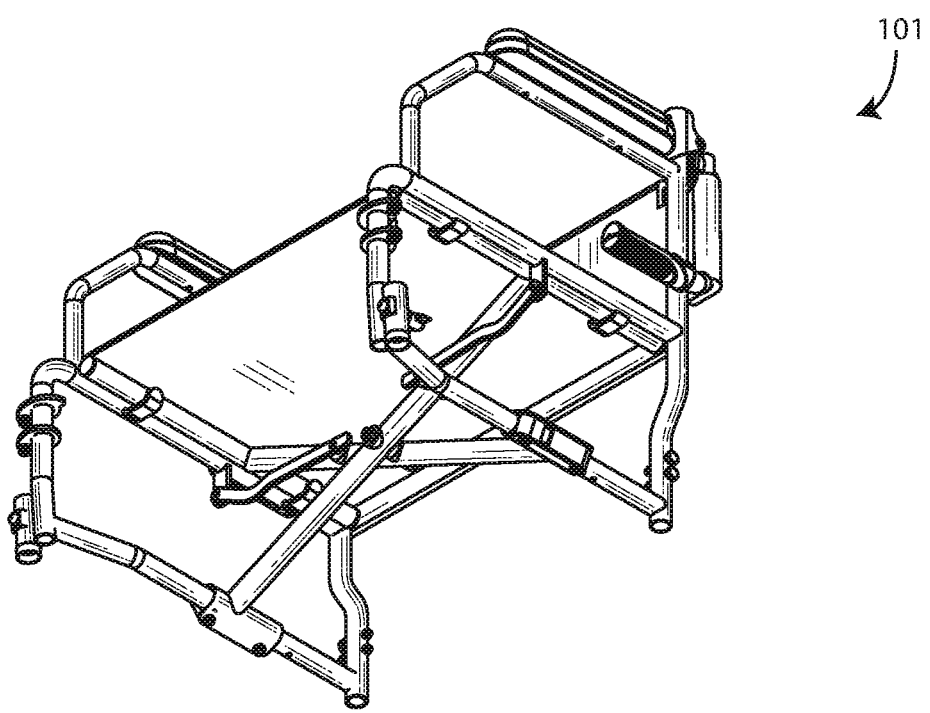

FIGS. 31-32 illustrate another method of reducing dimensions of a chassis 3101 such that it can fit within a box suitable for a retailer's shelf. In FIGS. 30-31, at least one tube 3102,3103 of the chassis 3101 comprises a telescoping tube. Accordingly, a first portion of the tube 3102,3103 can slide into, or out of, another portion of the tube 3102,3103. For example, tubes 3102,3103 are shown in the extended position 3100 in FIG. 31, but are in the retracted position 3200 in FIG. 32. This serves to reduce the depth 3201 of the chassis 3101. One or more quick release mechanisms 3104, 3105 can be used to lock the tubes 3102,3103 in either the extended position 3100 or the retracted position 3200 as desired. Note that while the telescoping tubes are shown being applied to horizontal tubes running parallel to the page to reduce the depth 3201 in this illustrative embodiment, they could also be applied to horizontal tubes running perpendicular to the page to reduce the length as well. They can also be applied to vertical tubes to reduce the height. Of course, combinations of these configurations can be used as well. Still other configurations will be obvious to those of ordinary skill in the art having the benefit of this disclosure.

Accordingly, as described above, embodiments of the disclosure provide a wheelchair with selectively detachable, "quick release" wheels that allow the folded chassis of the wheelchair to fit into smaller packaging than in prior art designs. In one embodiment, quick release devices are coupled to rear tubes of the wheelchair, parallel to the armrests in one embodiment. Mounting posts of wheel assemblies then slide into the quick release devices and lock with quick-release, finger-turnable threaded members. In one embodiment, the rear wheel assemblies are offset by about two inches to provide more stability to the chair from front to back.

The ability to remove the wheels and/or footrests results in over a thirty percent reduction in shipping volume when the folded chassis is placed within a container. At the same time, the offset from the quick release mechanisms provides a longer wheelbase that would be the case if every dimension of a wheelchair were reduced. Accordingly, a user receives a full size seat and increased stability, all in a package that they can touch and feel on a retailer's shelf.

In one embodiment, to further reduce the size, a brake mechanism can be coupled only to the mounting post of the rear wheel assembly. Accordingly, when the rear wheel assembly is removed, so too is the brake assembly. This results in additional size reduction.

Other embodiments—in addition to detachability—are provided as well. For example, in another embodiment, the wheel assemblies are pivotable to reduce chassis size. In still other embodiments, the tubes of the chassis can be telescoping. Other configurations, as noted above, will be obvious to those of ordinary skill in the art having the benefit of this disclosure.

While numerous utilitarian features of wheelchairs configured in accordance with one or more embodiments of the disclosure have been described above, each wheelchair has associated therewith a multitude of ornamental design features as well. To be sure, some of the elements associated with embodiments of the disclosure provide both functional and ornamental design features. For example, the removable wheel assemblies, while providing functionality, also create an ornamental design as well. Similarly, the shape of the various chassis configurations, while offering functionality, provide a very unique ornamental design for the wheelchair as well.

Turning now to FIGS. 33-50, illustrated therein are ornamental design elements of one explanatory wheelchair 100 and chassis 101 configured in accordance with one or more embodiments of the disclosure. The wheelchair 100 and chassis 101 of FIGS. 33-50 are shown in various configurations. For example, in FIGS. 33-42, the wheelchair is shown with its wheel assemblies attached. In FIGS. 43-50, the chassis 101 is shown with wheel assemblies detached.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

What is claimed is:

1. A wheelchair, comprising:
 a chassis defining a seat, a backrest, one or more armrests, and an undercarriage;
 one or more front caster wheels coupled to, and selectively detachable from, the undercarriage;
 one or more rear wheel assemblies, each rear wheel assembly comprising a rear wheel, an axle, and a mounting post extending distally from the axle at a substantially orthogonal angle relative to the axle; and
one or more quick release devices;
each mounting post of each rear wheel assembly coupled to the undercarriage by a respective one of the one or more quick release devices such that the each the one or more rear wheel assemblies is selectively detachable from the undercarriage; and
the one or more quick release devices each comprising a clamp and one or more threaded retention devices to couple a first end of the clamp to the undercarriage and a second end of the clamp to the mounting post;
the one or more rear wheel assemblies each comprising a brake assembly coupled only to the mounting post, the brake assembly comprising a handle to pivot to selectively apply stopping friction to the rear wheel.

2. The wheelchair of claim 1, the clamp comprising an extended figure eight clamp.

3. The wheelchair of claim 1, each of the one or more quick release devices to couple to the undercarriage in an orientation that is substantially parallel with the one or more armrests.

4. The wheelchair of claim 1, the one or more quick release devices to offset the mounting post from a plane defined by the backrest by at least one inch.

5. The wheelchair of claim 4, the one or more quick release devices to offset the mounting post from the plane by about two inches.

6. The wheelchair of claim 1, the one or more threaded retention devices comprising at least a first threaded retention device to couple the first end of the clamp to the undercarriage and a second threaded retention device to couple the second end of the clamp to the mounting post.

7. The wheelchair of claim 6, the second threaded retention device comprising a handle to enable tool-less rotation of the second threaded retention device to couple the second end of the clamp to the mounting post.

8. The wheelchair of claim 7, the one or more threaded retention devices further comprising a third threaded retention device to couple the first end of the clamp to the undercarriage.

9. The wheelchair of claim 1, wherein when the one or more front caster wheels and the one or more rear wheel assemblies are detached from the undercarriage, the backrest and the one or more armrests are foldable atop the seat and the undercarriage is foldable beneath the seat to form a folded chassis.

10. The wheelchair of claim 9, the folded chassis having a length less than twenty-four inches, a width less than twenty-two inches, and a height less than ten inches.

11. The wheelchair of claim 10, the length less than about twenty-three inches, the width less than about twenty-one inches, and the height less than about nine inches.

12. The wheelchair of claim 1, the chassis defined by one or more chassis tubes, at least one chassis tube telescoping.

13. A wheelchair, comprising:
a chassis defining a seat, a backrest, one or more arm rests, and an undercarriage, the chassis defining a first major dimension that is substantially parallel to a plane defined by the seat and a second major dimension that is substantially orthogonal to the plane; and
two rear wheel assemblies, each rear wheel assembly comprising a mounting post extending distally from an axle; and
two quick release devices, each quick release device comprising an extended figure eight clamp to couple each mounting post to the undercarriage such that the each rear wheel assemblies is selectively detachable from the undercarriage to reduce the first major dimension and the second major dimension;
wherein the each quick release device, when coupled to the undercarriage, is to offset the each mounting post from another plane defined by the backrest to extend the second major dimension by at least one inch.

14. The wheelchair of claim 13, wherein when the two rear wheel assemblies are detached from the chassis, the chassis is foldable to form a folded chassis having a length less than twenty-four inches, a width less than twenty-two inches, and a height less than ten inches.

15. The wheelchair of claim 14, the each quick release device further comprising one or more threaded retention devices to couple a first end of the extended figure eight clamp to the undercarriage and a second end of the figure eight clamp to the mounting post.

16. The wheelchair of claim 15, at least one threaded retention device comprising a handle to enable tool-less rotation of the threaded retention device to couple the second end of the figure eight clamp to the mounting post.

17. The wheelchair of claim 16, the each rear wheel assembly comprising a brake assembly coupled to the mounting post, the brake assembly comprising another handle to pivot to selectively apply stopping friction to a rear wheel.

18. The wheelchair of claim 13, further comprising two push handles coupled to the backrest.

19. The wheelchair of claim 18, the two push handles comprising collapsible push handles configured to fold downward to be adjacent to upper portions of vertical side members of the chassis.

* * * * *